(12) United States Patent
Tatituri et al.

(10) Patent No.: US 11,915,195 B2
(45) Date of Patent: *Feb. 27, 2024

(54) SYSTEMS AND METHODS FOR INTELLIGENT FIELD MATCHING AND ANOMALY DETECTION

(71) Applicant: Oracle International Corporation, Redwood Shores, CA (US)

(72) Inventors: Venkat Sai Tatituri, Leander, TX (US); Amir Hossein Rezaeian, San Mateo, CA (US); Ram Razdan, Isleworth (GB); Beat Nuolf, Arvagh (IE); Shintaro Okuda, San Francisco, CA (US); James Edward Bridges, East Palo Alto, CA (US); Joseph Michael Albowicz, Redwood City, CA (US)

(73) Assignee: Oracle International Corporation, Redwood Shores (CA)

( * ) Notice: Subject to any disclaimer, the term of this patent is extended or adjusted under 35 U.S.C. 154(b) by 38 days.

This patent is subject to a terminal disclaimer.

(21) Appl. No.: 17/809,342

(22) Filed: Jun. 28, 2022

(65) Prior Publication Data
US 2022/0351132 A1    Nov. 3, 2022

Related U.S. Application Data

(63) Continuation of application No. 16/570,958, filed on Sep. 13, 2019, now Pat. No. 11,392,894.
(Continued)

(51) Int. Cl.
*G06Q 10/00* (2023.01)
*G06Q 10/0875* (2023.01)
(Continued)

(52) U.S. Cl.
CPC ....... *G06Q 10/0875* (2013.01); *G06F 16/904* (2019.01); *G06F 16/90335* (2019.01); *G06N 20/00* (2019.01); *G06Q 10/0838* (2013.01)

(58) Field of Classification Search
CPC ............ G06Q 10/0875; G06Q 10/0838; G06F 16/90335; G06F 16/904; G06N 20/00;
(Continued)

(56) References Cited

U.S. PATENT DOCUMENTS 7,865,411 B2    1/2011 Stone et al.
10,148,677 B2 * 12/2018 Muddu ................. G06F 3/0482
(Continued)

FOREIGN PATENT DOCUMENTS

BR    112019026645 A2 *  6/2020 ........... G06F 21/552

OTHER PUBLICATIONS

U.S. Appl. No. 16/570,958, Notice of Allowance dated Mar. 16, 2022, 8 pages.

*Primary Examiner* — Russell S Glass
(74) *Attorney, Agent, or Firm* — Mughal Gaudry & Franklin PC

(57) ABSTRACT

The present disclosure relates to systems and methods that use an artificial intelligence (AI) model to generate outputs that can be evaluated to predict which logged entry items match entry request record line items of an entry request record. Additionally, the present disclosure relates to systems and methods for intelligently detecting anomalies within data sets.

18 Claims, 13 Drawing Sheets

Related U.S. Application Data

(60) Provisional application No. 62/748,219, filed on Oct. 19, 2018.

(51) Int. Cl.
    *G06Q 10/083*     (2023.01)
    *G06N 20/00*     (2019.01)
    *G06F 16/904*     (2019.01)
    *G06F 16/903*     (2019.01)

(58) Field of Classification Search
    CPC ........ G06N 3/044; G06N 3/045; G06N 3/047;
                G06N 3/084; G06N 3/088; G06N 5/01;
                   G06N 5/02; G06N 5/048; G06N 7/01;
                         G06N 20/10; G06N 20/20
    USPC .......................................................... 705/29
    See application file for complete search history.

(56) References Cited

U.S. PATENT DOCUMENTS

| | | |
|---|---|---|
| 2012/0136840 A1 | 5/2012 | Oaten et al. |
| 2016/0171627 A1 | 6/2016 | Lyubarskiy |
| 2017/0061322 A1* | 3/2017 | Chari .................. H04L 63/1425 |
| 2018/0053115 A1 | 2/2018 | Vachhani et al. |
| 2018/0158020 A1 | 6/2018 | Khasis |
| 2018/0315141 A1 | 11/2018 | Hunn et al. |
| 2018/0316707 A1* | 11/2018 | Dodson ................... H04L 43/16 |
| 2019/0180290 A1 | 6/2019 | Jubete et al. |
| 2019/0251149 A1 | 8/2019 | Moyers |
| 2020/0012980 A1 | 1/2020 | Li et al. |
| 2020/0074515 A1 | 3/2020 | Ghatage et al. |
| 2020/0110930 A1 | 4/2020 | Simantov et al. |
| 2022/0051109 A1 | 2/2022 | Rogers |

\* cited by examiner

SYSTEMS AND METHODS FOR INTELLIGENT FIELD MATCHING AND ANOMALY DETECTION

CROSS-REFERENCE TO RELATED APPLICATIONS

This application is a continuation of U.S. patent application Ser. No. 16/570,958, filed Sep. 13, 2019, which claims the priority benefit of U.S. Provisional Application No. 62/748,219, filed on Oct. 19, 2018. Each of these applications is incorporated by reference herein in their entirety for all purposes.

TECHNICAL FIELD

The present disclosure relates to systems and methods that use an artificial intelligence (AI) model to match line items of a logged entry to line items of an entry request record for automatically processing the logged entry for finalization. Additionally, the present disclosure relates to systems and methods for intelligently detecting anomalies within data sets.

BACKGROUND

Applications are often used to facilitate the finalization of logged entries received from originators. For example, when an item is purchased from an originator by a user of a company, an entry request record for the item is created by the company and sent to the originator that provides the item. In return, the company receives a logged entry proposed for finalization (for the item) from the originator upon delivery of the item. Logged entries are typically processed and entered or imported to the company's internal systems using an application before the logged entry can be finalized and processed. Finalization of a logged entry generally involves identifying the line items listed on the corresponding entry request record that was created when the item was purchased. However, logged entries are received in originator-specific formats, and thus, the line items of logged entries often do not match up exactly to the line items of entry request records, which are created by the company purchasing the item. Further, other information, such as unit of measurements, may be different between logged entries in an originator-specific format and entry request records created by the company. For example, if an entry request record includes a single line item for a laptop, the corresponding logged entry (proposed for finalization) from the originator may include several line items related to the laptop. The logged entry line items may include, for example, one line item for a laptop, one line item for a battery adapter, and one line item for a keyboard. Further, the logged entries typically do not include the corresponding line number of the corresponding entry record. As a result, when users process logged entries for finalization, the users need to search for the particular entry request record line number of the entry request record line item that corresponds to the logged entry line item. However, this process is overly burdensome and inefficient.

SUMMARY

Certain aspects and features of the present disclosure relate to systems and methods for providing an interface that displays an intelligent prediction of one or more entry request record (e.g., purchase order) line numbers that are likely to correspond to a logged entry (e.g., invoice) line item. The intelligent matching of logged entries and/or logged entry line items (e.g., created by an originator, such as a supplier) to entry request record line items (e.g., created by the company purchasing an item provided by the originator) reduces the number of logged entries that are rejected or held as being in an incomplete/not approved state. Further, certain aspects and features of the present disclosure relate to an artificial intelligence (AI) model that is trained using a data set of pairs of previously-matched logged entry (e.g., previously finalized and processed) and entry request record line items. As a non-limiting example, if previous entry request records that include a single line item for a laptop were previously matched (e.g., during the process for finalizing the logged entry, such as paying an invoice) to a finalized or yet-to-be-finalized logged entry (e.g., matched with a logged entry for the purpose of importing the logged entry into an application for finalizing the logged entry, which results in paying the originator's invoice) that included three line items—one line for a laptop, one line for a keyboard, and one line for a battery adapter—then, the AI model can be trained so as to detect a dependency between the single line item of a laptop listed in entry request records and the three line items listed in finalized logged entries provided by the originator. After the AI model has been trained, then the next time a logged entry is received from an originator with the three line items of the laptop, the keyboard, and the battery adapter, then the AI model can predict which line item(s) in the entry request record corresponds to each logged entry line item. The predicted entry request record line items can be displayed in an interface for a user to review and/or revise, if necessary. If the user modifies a predicted entry request record line item (e.g., if the predicted entry request record line item is incorrect), then the modification may be sent to the AI model to improve future predictions.

Further, certain aspects and features of the present disclosure relate to systems and methods that intelligently compare characteristics of logged entries (e.g., originator information, product description, invoice value, etc.) with characteristics of entry request records to determine dependencies between logged entry line items and entry request record line items (e.g., on a many-to-one basis, on a one-to-many basis, on a many-to-many basis, on a one-to-one-basis, etc.). In some implementations, the predicted entry request record line item can be automatically populated in corresponding data fields of the interface (e.g., of an application, such as an accounts payable application) in an autocomplete or type-ahead manner. For example, even though the entry request record line number (e.g., an identifier representing a purchase order line item) may not be included on a logged entry, when the user enters in data from the logged entry into the interface, the corresponding entry request record line item identifier can be predicted and populated in a data field of the interface. The entry request record line items are often difficult for the user to identify, however, the entry request record line item may be necessary in order for the logged entry to be finalized (e.g., for an invoice of a supplier to be paid). Certain embodiments described herein relate to systems and methods for the automatic prediction of entry request record line items to finalize logged entries for importing into internal systems to pay the originator. In some implementations, the interface can display one or more alternative recommendations of values for the entry request record line items.

The AI model may be trained on a set of previously finalized logged entries, entry request records, entry request record line shipments, entry request record receipts, and/or any other suitable accounting document. For example, a set of previously-finalized logged entries may include logged entries containing logged entry line items, which were previously matched to one or more entry request record line items of entry request records. In some implementations, machine-learning algorithms or techniques used for the prediction can include an ensemble of multi-label classifiers, artificial neural networks (including backpropagation, Boltzmann machines, etc.), Bayesian statistics (e.g., Bayesian networks or knowledge bases), logistical model trees, support vector machines, information fuzzy networks, Hidden Markov models, hierarchical clustering (unsupervised), self-organizing maps, clustering techniques, and other suitable machine-learning techniques (supervised or unsupervised). For example, an AI model can retrieve one or more machine-learning algorithms stored in a data store (not shown) to generate an artificial neural network in order to identify patterns or correlations within a data set of the logged entry data, the entry request record data, and/or any other data set. As a further example, the artificial neural network can learn that when a data object (in the data set) includes value A and value B, then value C is predicted as relevant data for the user. In yet another example, a support vector machine can be used either to generate output data that is used as a prediction, or to identify learned patterns within the data set.

In some implementations, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, including: collecting logged entry data from one or more data sources (e.g., internal and/or third-party external data sets), the logged entry data representing one or more logged entries received from at least one originator, each logged entry of the one or more logged entries corresponding to an entry request record that initiated the originator to create a logged entry for the item purchased, each logged entry of the one or more logged entries including one or more logged entry line items that sum to an logged entry value, and each logged entry line item of the one or more logged entry line items corresponding to a product or service; collecting entry request record data from one or more additional data sources, the entry request record data representing one or more entry request records transmitted to the at least one originator, each entry request record including one or more entry request record line items that sum to an entry request record value, and each entry request record line item of the one or more entry request record line items corresponding to a product or service; training a machine-learning model based on the collected logged entry data and the collected entry request record data, the training of the machine-learning model including using one or more machine-learning techniques (e.g., supervised machine learning) to detect one or more dependency patterns by matching at least the logged entry value of the one or more logged entries with the entry request record value of an entry request record of the one or more entry request records, and each dependency pattern of the one or more dependency patterns representing a correlation between at least one logged entry line item and at least one entry request record line item (e.g., a purchase order including a single purchase order line item corresponding to a laptop can be correlated with an invoice including 3 items associated with a laptop, such as the laptop, a keyboard, and a battery); receiving a particular logged entry including a plurality of particular logged entry line items; inputting the particular logged entry into the machine-learning model; and in response to inputting the logged entry into the machine-learning model, generating a prediction of a particular entry request record line item that is predicted to correspond to the plurality of particular logged entry line items, and the prediction of the particular entry request record line item being generated as an output of the machine-learning model. Other embodiments of this aspect include corresponding computer systems, apparatus, and computer programs recorded on one or more computer storage devices, each configured to perform the actions of the methods.

Implementations may include one or more of the following features. The computer-implemented method where the prediction of the particular entry request record is based on the machine-learning model detecting a dependency pattern between the collected logged entry data and the collected entry request record data, the detected dependency pattern indicating that the plurality of particular logged entry line items has previously corresponded to the particular entry request record line item. The computer-implemented method where the one or more dependency patterns are further detected when product data included in the particular logged entry matches the product data included in the predicted particular entry request record line item, and where the product data describes a product requested from the at least one originator. The computer-implemented method where the generation of the prediction further includes consolidating the plurality of particular logged entry line items into a single logged entry line item and matching the single logged entry line item with the predicted particular entry request record line item. The computer-implemented method further including: displaying the generated prediction of the particular entry request record line item on an interface. Implementations of the described techniques may include hardware, a method or process, or computer software on a computer-accessible medium.

In addition, certain aspects and features of the present disclosure relate to systems and methods for intelligently detecting anomalies within data sets, such a resource usage reports (e.g., expense reports), logged entries, and entry request records. Further, certain aspects and features of the present disclosure relate to running one or more anomaly detection algorithms on resource usage data (e.g., data representing all or part of the expense reports of a company) and third-part data sets (e.g., public data that is recorded by a third party, such as the Patent Application Information Retrieval (PAIR) database at the US Patent and Trademark Office) to identify conditions that represent anomalies within resource usage reports. For example, while using anomaly detection algorithms to evaluate resource usage reports within a company may result in identifying anomalous ranges of expenses, the additional evaluation of resource usage reports in light of third-party data sets may enhance the prevention of fraudulent, erroneous, duplicate, out-of-policy and/or unnecessary expenses within resource usage reports. Additionally, the anomaly detection can have a seasonal component. For example, anomaly detection can detect that certain expenses are incurred by employees of a company seasonally. Further, for example, the third-party data sets may be evaluated to determine that expenses incurred by employees during certain seasons is acceptable under company policy, whereas, the same expenses incurred by employees during other seasons is anomalous or unacceptable.

In some implementations according to the present disclosure above, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method, including: accessing a third-party data set from a third-party data source (e.g., in the legal use case, accessing a data set from the public database of the patent office), the third-party data set including a set of records recorded by a third-party system associated with the third-party data source (e.g., the set of records can include filings submitted to the patent office by patent applicants, which are published on the public database); accessing a resource usage data set from one or more resource usage data sources (e.g., the expense data can be stored at internal or external servers), the resource usage data set representing one or more resource usage reports created by users, and each resource usage report of the one or more resource usage reports being generated in association with a user requesting reimbursement of an expense; generating a model for detecting anomalies within the one or more resource usage reports, the model being generated by executing one or more anomaly detection techniques (e.g., an anomaly detection algorithm) on the third-party data set and/or the resource usage data set. The computer-implemented method also includes inputting a particular resource usage report into the model, the model evaluating whether a record of the set of records included in the third-party data set is inconsistent with the particular resource usage report and/or whether an outlier data point exists within the particular resource usage report. The computer-implemented method also includes in response to inputting the particular resource usage report into the model, generating an output identifying that the particular resource usage report contains an anomaly; and generating a notification (e.g., the notification can be automatically sent to a manager) or displaying the generated anomaly in an interface for the expense auditor/reviewer in response to the particular resource usage report containing the anomaly. Other embodiments of this aspect include corresponding computer systems, apparatus, and computer programs recorded on one or more computer storage devices, each configured to perform the actions of the methods.

Implementations may include one or more of the following features. The computer-implemented method further including: defining a plurality of seasonal time periods, each seasonal time period of the plurality of seasonal time periods representing a duration of time within a year (e.g., a fiscal quarter). The computer-implemented method may also include evaluating the expense data set to detect one or more resource usage patterns, an resource usage pattern of the one or more resource usage patterns indicating at least one resource usage that is likely to occur within a particular seasonal time period of the plurality of seasonal time periods (e.g., processing the expense data to find expenses that are likely occur during each of the seasons). The computer-implemented method may also include incorporating the one or more resource usage patterns into the generated model. The computer-implemented method where the third-party data set is publicly available from the third-party system. The computer-implemented method where the third-party data set is privately accessible only to a set of users. The computer-implemented method where the anomaly is detected when a data point included in the particular resource usage report does not correspond to the record of the set of records, and where, when the anomaly is detected, the model is updated so as to detect the anomaly in other resource usage reports. Implementations of the described techniques may include hardware, a method or process, or computer software on a computer-accessible medium.

Advantageously, the intelligent matching of logged entry line items to entry request record line items can greatly reduce the time needed to finalize logged entries created by originators, and can improve the accuracy of logged entry processing. According to certain embodiments described above and herein, originators would not need to customize their logged entry formats to match the format of the entry request record created by the company because an AI model can detect and learn the dependencies between logged entry line items and entry request record line items, regardless of the format. In addition, as an advantage, certain embodiments relate to detecting anomalies within internal data sets representing expense reports. As a benefit, private or public data sets generated by third parties may be leveraged to enhance fraud detection and auditing of resource usage.

BRIEF DESCRIPTION OF THE DRAWINGS

The specification makes reference to the following appended figures, in which use of like reference numerals in different figures is intended to illustrate like or analogous components.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Many types of computing systems and applications generate vast amounts of data pertaining or resulting from operation of that computing system or application. These vast amounts of data are frequently then stored into collected locations, such as log files/records, which can be reviewed at a later time period if there is a need to analyze the behavior or operation of the system or application.

While the below description may describe embodiments by way of illustration with respect to "log" data, processing of other types of data are further contemplated. Therefore, embodiments are not to be limited in its application only to log data. In addition, the following description may also interchangeably refer to the data being processed as "records" or "messages", without intent to limit the scope of the invention to any particular format for the data.

Figure 1A:
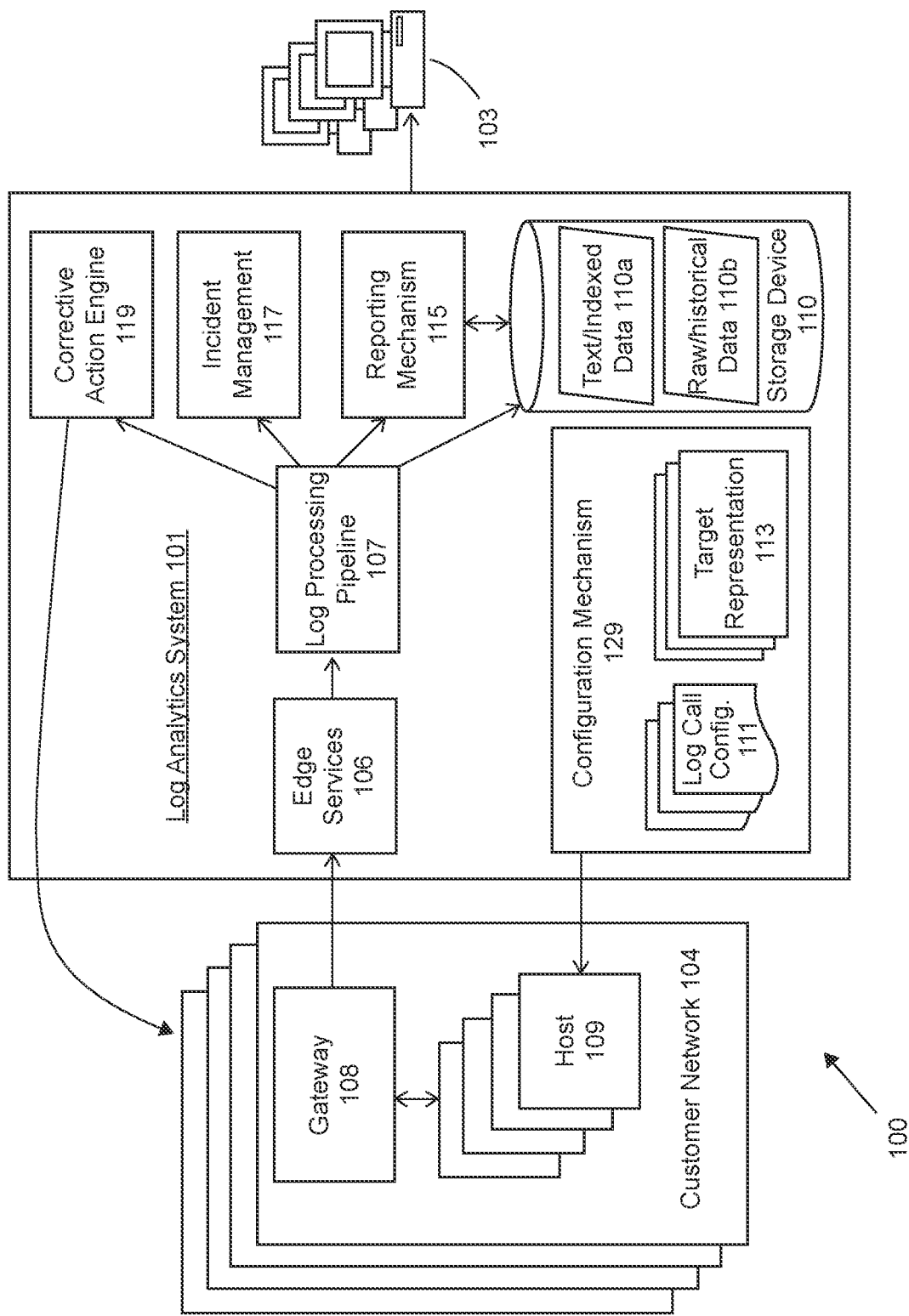
FIG. 1A illustrates an example system for configuring, collecting, and analyzing log data according to some embodiments of the present disclosure.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 101, where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
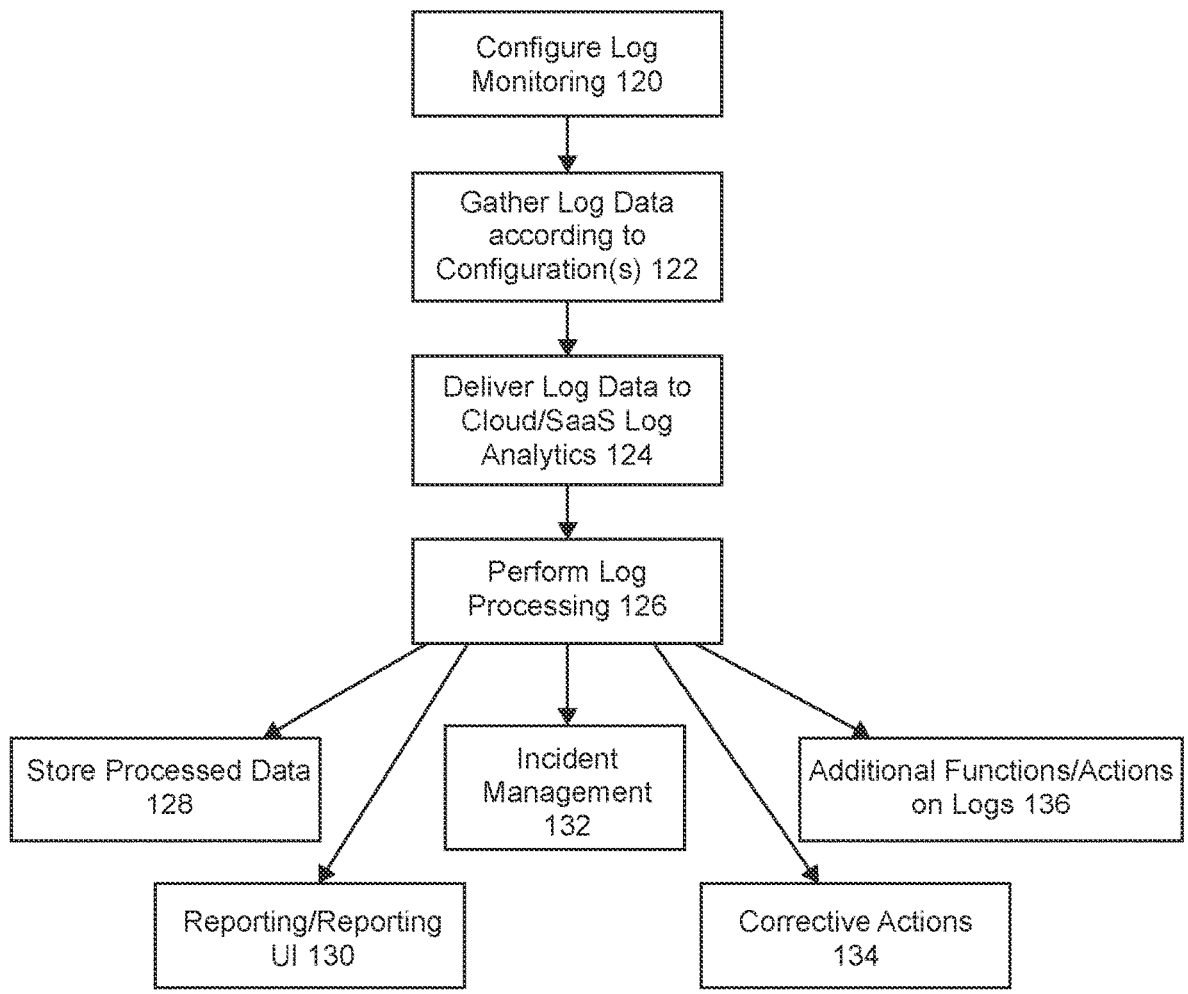
FIG. 1B illustrates a flowchart of an approach to use a system to configure, collect, and analyze log data.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

The log collection configuration 111 comprises the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include customer-defined/customer-customized rules.

The target representations 113 identify "targets", which are individual components within the customer environment that that contain and/or produce logs. These targets are associated with specific components/hosts in the customer environment. An example target may be a specific database application, which is associated with one or more logs and/or one or more hosts.

The next action at 122 is to capture the log data according to the user configurations. The log data may originate from any log-producing source location, such as a database management system, database application, middleware, hardware logs, operating system logs, application logs, application server logs, database server logs, and any other type of log that monitors the behavior of a system or application.

In some instances, the association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks, perform any intake processing (e.g., applying grammar rules to transform each message into a normalized message or skeleton message that lacks components of inter-cluster message variability and assigning each transformed message to an initial cluster identified using a hash of the transformed message) and may place the data into an inbound data store for further processing by a log processing pipeline 107.

At 126, the log processing pipeline 107 performs a series of data processing and analytical operations upon the collected log data. In various instances, the processing and analytical operations can include actions performed prior to storing the data and/or by performing actions on data retrieved from a data store. For example, one or more log messages may be assigned to initial clusters at an ingest time (e.g., upon receiving the log message(s) from a source), and the log message(s) may be subsequently retrieved in response to a query to modify or supplement the initial clustering and generate statistics and/or presentations based on the clustering.

At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110a (e.g., as a SOLR cluster) and a raw/historical data store 110b (e.g., as a HDFS cluster).

A SOLR cluster corresponds to an Apache™ open source local search platform. The SOLR cluster can use a search library to perform full-text indexing and searching of data stored in a HDFS cluster. The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

An HDFS cluster corresponds to a Hadoop Distributed File System cluster. The HDFS cluster can include many (e.g., thousands) of servers to host storage (e.g., directly attached storage) and execute tasks, such as tasks defined by user applications. The HDFS cluster can include a master/slave architecture with a single master server for managing a namespace of the cluster. A file can be divided into blocks to be stored at multiple DataNodes of the HDFS cluster. The master server can perform file operations (e.g., open, close, etc.) and determine which blocks are to be stored on which data nodes. The master server can communicate with data nodes for requests to read or write data in response to receipt of corresponding file operations.

Figure 2:
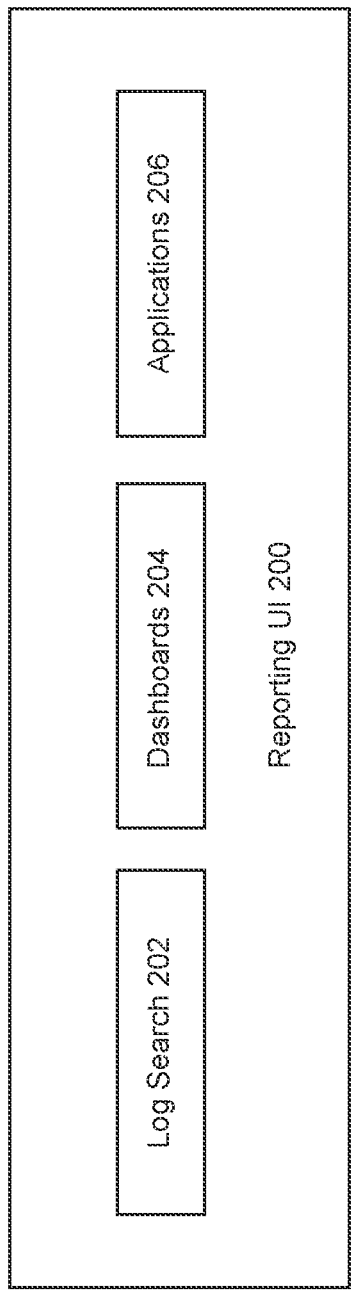
FIG. 2 illustrates an example of a reporting user interface.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
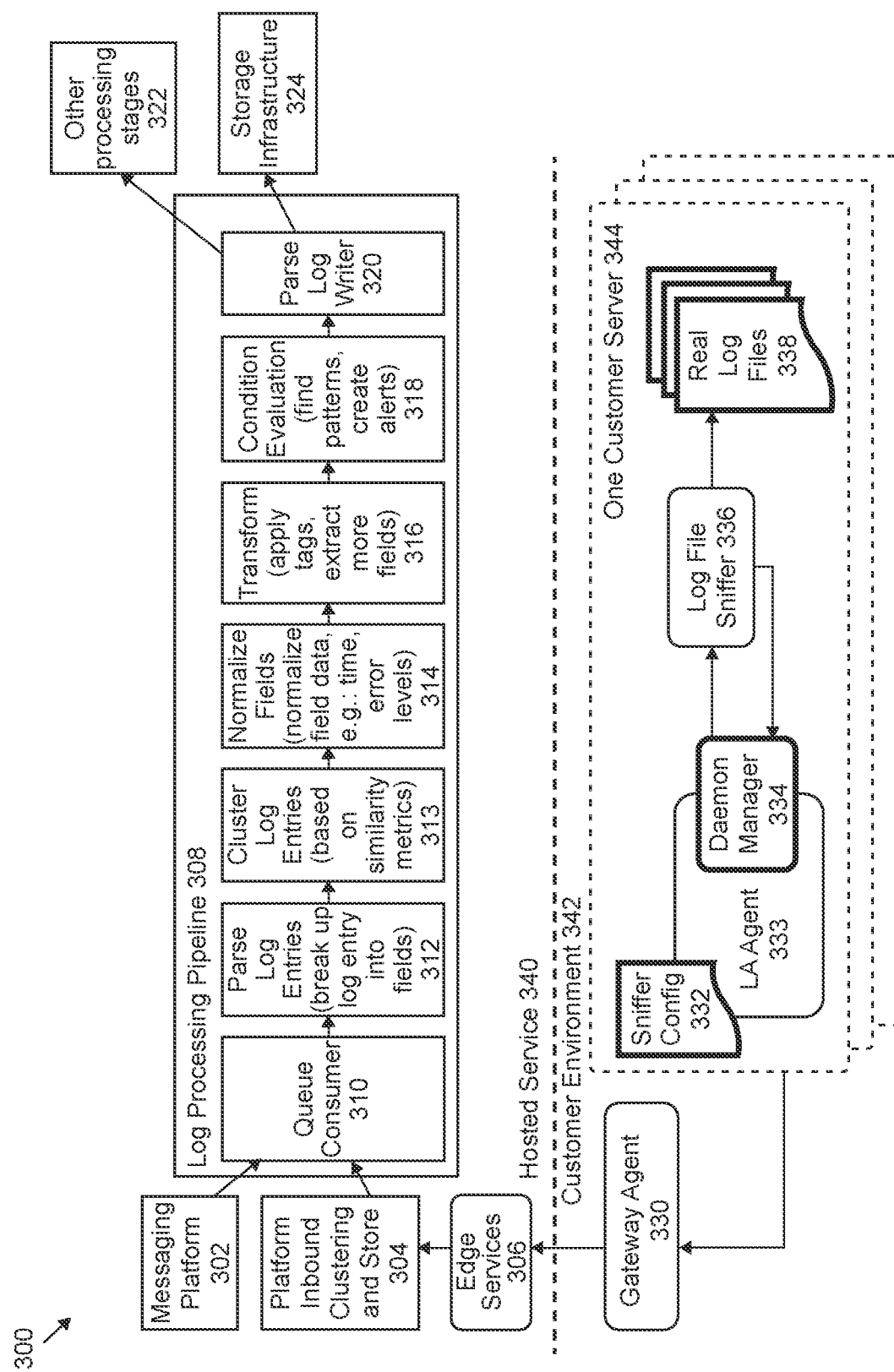
FIGS. 3A-3C are flow diagrams illustrating the internal structure of the log analytics system at a host environment.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338.

A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data can be immediately processed to assign each log message to an initial cluster and stored into an inbound data storage device 304 (the "platform inbound clustering store"). In some instances, an initial or preliminary processing may be performed at an ingest time, which can include a time corresponding to (e.g., before, shortly or immediately after, or concurrent with) storage of the data. The initial or preliminary processing may include (for example) detecting which parts of the data are non-variable components and determining an initial cluster for each log message based on the non-variable components detected in the message. For example, a hashing technique may be applied to a value of each non-variable component to generate an identifier of the initial cluster. The log message may then be stored in association with the identifier of the initial cluster or other cluster data can be stored to indicate that the log message is associated with the initial cluster. Cluster assignments may be further refined, enhanced and/or used during subsequent processing, such as during processing that occurs during a time of subsequent resource availability and/or in response to receiving a query for data corresponding to or potentially corresponding to the associated log messages.

Thus, in some instances, a queue is managed and maintained, where queue elements corresponding to one or more log messages for which cluster assignments are to be refined, enhanced and/or used. An element may be added to the queue (for example) subsequent to an initial storing of the queue element and/or in response to receiving a query for data corresponding to or potentially corresponding to one or more associated log messages. The queue can be used for the log processing pipeline 308.

A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields or components. The "log type" configured for the log specifies how to break up the log entry into the desired fields.

At a "cluster" stage 313, log data is further analyzed to assign individual log messages to a cluster. Specifically, multiple initial clusters to which log messages were assigned during an intake process (e.g., at 304) can be assessed to determine whether some of the initial clusters are to be merged together. The assessment can include identifying one or more representative samples for each cluster and performing pair-wise quantitative comparative assessments. Cluster pairs assessed via a pair-wise comparative assessment can include clusters with log messages having same or similar number of components (or words). In some instances, each pair of clusters includes clusters associated with a number of components that are the same or different from each other by less than a threshold number (e.g., that is predefined, a default number, or identified by a user) is evaluated using the assessment. The comparative assessment may be performed iteratively and/or in a structured manner (e.g., such that pairs with a same number of components are evaluated prior to evaluating pairs with a different number of components).

The pair-wise quantitative comparative assessment can include, for example, generating a similarity metric using the representative messages and determining whether the metric exceeds a threshold metric (e.g., that is predefined, a default number of identified by a user). The similarity metric may be based on (for example) whether the representative messages include a same (or similar) number of components, number of variable (or non-variable) components, content of each of one or more non-variable components, characteristic (e.g., format, character type or length) of one or more variable components, and so on. The similarity metric may be based on generating a correlation coefficient between the inter-cluster messages or by performing a clustering technique using a larger set of messages to an extent to which representative messages of the clusters are assigned to a same cluster or share components (e.g., if a technique includes using a component analysis, such as principal component analysis or independent component analysis.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case unabbreviated term "error").

The "transform" stage 316 can be used to synthesize new content from the log data. As an example, "tags" can be added to the log data to provide additional information about the log entries. As another example, a tag may identify a cluster to which a log message is assigned.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/customers or alert to another system or mechanism. As one example, a condition may define an event that corresponds to a change in cluster assignments, such as detecting that a quantity (e.g., number or percentage) of log messages assigned to a given cluster has exceeded a threshold (e.g., that is fixe and pre-defined or defined by a user, a client or rule), such as being below a lower threshold or above an upper threshold. As another example, a condition may define an event that corresponds to a degree to which a quantity of log messages being assigned to a given threshold is changing, such as by identifying a threshold for a slope of a time series or a threshold for a difference in counts or percentages or log message assigned to the cluster between two time bins. As yet another example, a condition may define an event that corresponds to multiple cluster assignments, such as an event that indicates that a time series of each of the multiple clusters has a similar shape (e.g., by determining whether curve-fit coefficients are similar enough to be within a threshold amount, by determining whether a time of one or more peaks in time series are within a defined threshold time, determining whether a correlation coefficient between time series of the clusters exceeds a threshold, and/or determining whether a difference between a variability of a time series of each of the individual clusters and a variability of a sum of the time series exceeds a threshold value).

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
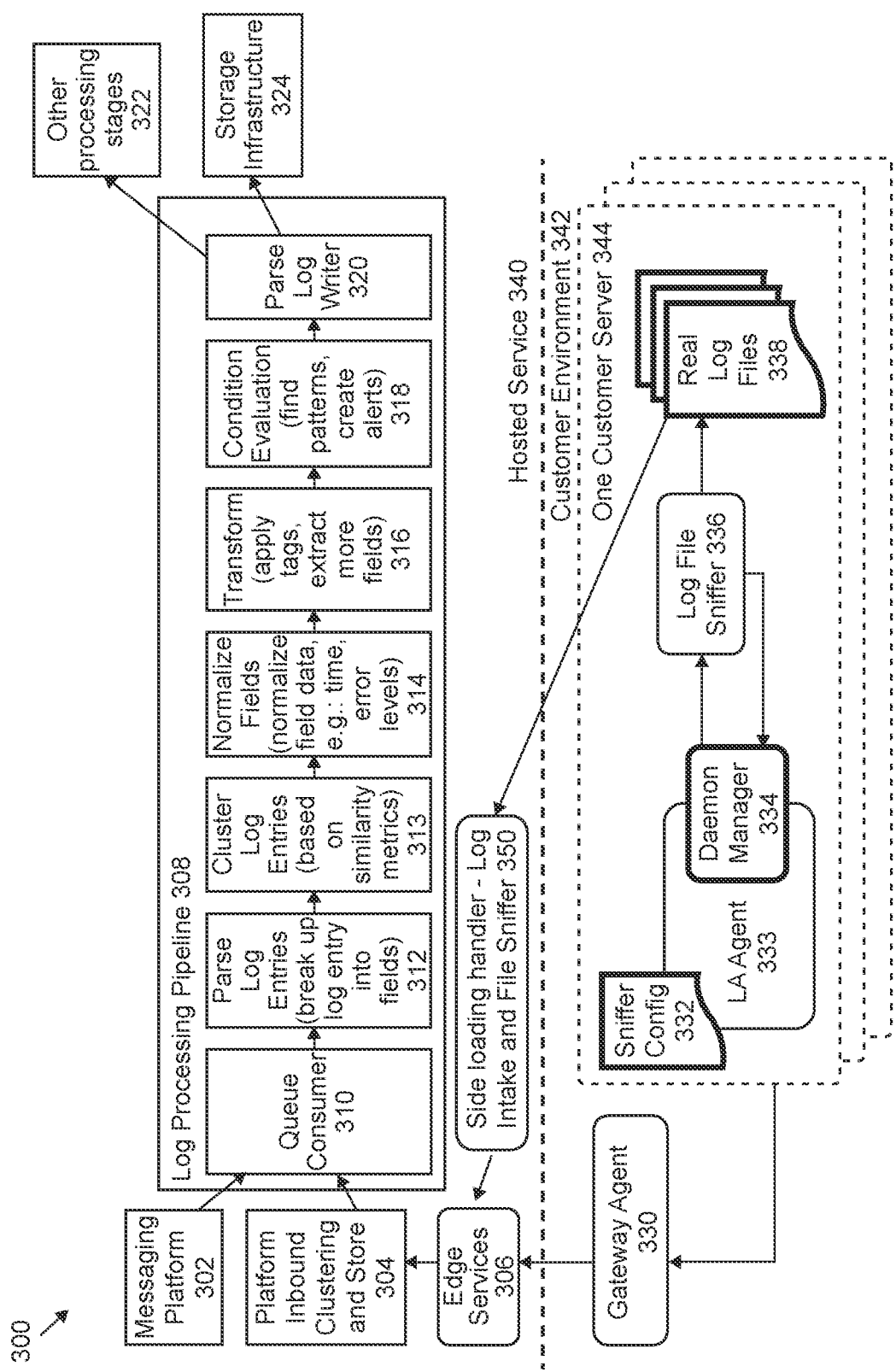
Figure 3C:
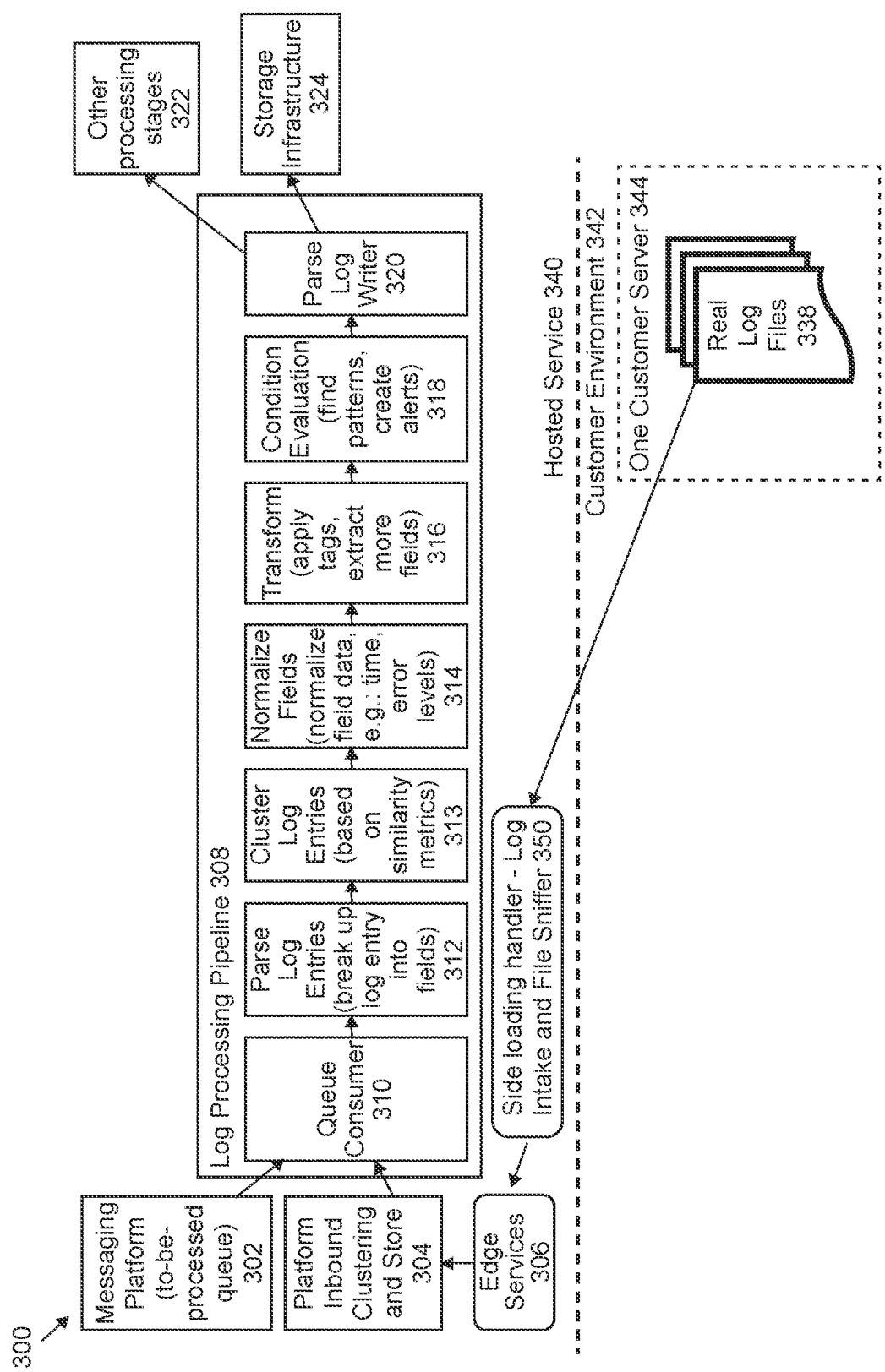

As shown in FIG. 3B, some embodiments provide a side loading mechanism 350 to collect log data without needing to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

Typically, companies purchase products or services from originators. For example, an employee can purchase a work laptop from an originator. As a result, an entry request record for the laptop is generated and sent to the originator. In return, the originator sends the company a logged entry listing the purchased laptop. However, logged entries are often provided to companies in originator-specific formats, which may not correspond exactly to the entry request record. For instance, the entry request record may include a single line item that lists the laptop for purchase, however, the logged entry received from the originator may list three logged entry line items, including the laptop, a keyboard, and a battery adapter. Before the logged entry can be finalized, however, the logged entry needs to be matched with its corresponding entry request record line item. This matching between one or more logged entry line items with one or more entry request record line items—especially when the logged entries and entry request record are often in different formats (e.g., with different units of measurement, different prices, different quantities of goods, and so on)—may be very difficult to perform.

Certain embodiments relate to systems and methods that automatically match one or more logged entry line items with the correct entry request record line item in the correct manner using the correct quantity of goods to avoid a hold or a rejection of the logged entry in the application. For logged entries that are imported from logged entry data sources, the systems and methods can determine the correct entry request record line items automatically using a trained AI model. For logged entries that are entered manually by a user, the systems and methods can receive input corresponding to a logged entry line item, process the input using the AI model, and generate a recommendation or prediction of the correct entry request record line item that initially triggered the logged entry. In some implementations, logged entries and/or entry request records may be intelligently matched with entry request record receipts.

Advantageously, the present disclosure provides solutions for getting logged entries into a ready and complete state as quickly as possible before the logged entry logged entry is processed for finalization. For example, the systems and methods may use historic information (including previous logged entry line items and previous purchase order line items) to identify how logged entry line items were previously matched with entry request record line items, and then identify a dependency between the one or more logged entry line items with the one or more entry request record line items based on similarities between the line items (e.g., line items of the invoice as compared to line items of the purchase order).

In some implementations, the AI model is used to analyze logged entry data from all or part of the previous logged entries that have been matched to a previous entry request record line item. For example, the AI model is used to match one or more logged entry line items of a previous logged entry to one or more entry request record line items of the corresponding previous entry request record. While a previous entry request record may list multiple entry request record line items, the one or more logged entry line items would have previously been matched to one or more entry request record line items, and thus, the AI model can be trained on the previous matches in order to predict which entry request record line items corresponding to logged entry line items for future logged entries received by the company. Logged entry line items and entry request record line items may have a one-to-one matching, a many-to-one matching, a one-to-many matching, and/or a many-to-many matching. Then, when a particular logged entry is received from a particular originator, the entry request record line items that correspond to the line items of the particular logged entry may be unknown to the user, however, the AI model can assist the user by predicting which entry request record line items of a particular entry request record are likely to correspond to the one or more logged entry line items. In some implementations, each logged entry line item must be matched to an entry request record line item of an existing entry request record before the logged entry can be finalized (e.g., paid).

In some implementations, an application can be configured to generate and display an interface on a computing device operated by a user. The interface can enable the user to enter details of one or more line items from a logged entry. The logged entry may list an entry request record number. The one or more line items of the entry request record corresponding to the entry request record number may also be presented in the interface after a "match" button or link is selected, for example. The user may select a "match" button to identify which entry request record line items correspond to each of the one or more logged entry line items. When the "match" button is selected, the interface may be triggered to call a REST (Representational State Transfer) service. The AI model may include an entry request record line item predictor, and the REST service may enable data to be passed between the AI model, which operates in an AI network environment, and the application (e.g., ORACLE FUSION). The interface call of the REST service may be triggered upon detecting a particular user interaction (e.g., the user entering "tab"). When the REST call is triggered, the data entered through the interface may be sent to the AI model, and a prediction of the one or more entry request record line items may be determined using the AI model, and the predicted one or more entry request record line items may be returned back to the interface and automatically displayed in respective data fields of the interface. In some implementations, a predictor may be integrated into the AI model. Further, a REST endpoint may be integrated directly into the application that provides the interface for entering logged entry line items and matching those line items to entry request record line items. The prediction may be applicable for the manual entry of logged entries into the system, however, certain embodiments also include the automatic entry of logged entries and the automatic prediction of entry request record line items for each logged entry line item that was automatically imported, for example, in a batch mode.

In some implementations, machine-learning algorithms or techniques used for the prediction can include artificial neural networks (including backpropagation, Boltzmann machines, etc.), Bayesian statistics (e.g., Bayesian networks or knowledge bases), logistical model trees, support vector machines, information fuzzy networks, Hidden Markov models, hierarchical clustering (unsupervised), self-organizing maps, clustering techniques, and other suitable machine-learning techniques (supervised or unsupervised). For example, AI model 430 can retrieve one or more machine-learning algorithms stored in a data store (not shown) to generate an artificial neural network in order to identify patterns or correlations within a data set of the logged entry data and/or the entry request record data or any other data set. As a further example, the artificial neural network can learn that when a data object (in the data set) includes value A and value B, then value C is predicted as relevant data for the user who originally transmitted the data object. In yet another example, a support vector machine can be used either to generate output data that is used as a prediction, or to identify learned patterns within the data set. Additionally, the AI model may be configured to perform a prediction capability that predicts entry request record line items for each logged entry line item entered into the interface.

In some implementations, the user can manually enter the logged entry line item information into the application, or the logged entry line items can be automatically loaded into the interface from a database that stored the line items of logged entries that have not been finalized yet (e.g., or from any other source(s), such as a spreadsheet import or electronic logged entries received from originator systems). The interface may present a selectable "match" button or link, that when selected, consolidates the one or more logged entry line items into a single logged entry line. That single logged entry line may be passed to the AI model using the REST service that can be called upon detection of a trigger event, such as a selection of the "match" button or a detection of the "tab" keystroke (or any other keystroke). In some implementations, matching between logged entry line items and entry request record line items may be performed before logged entries are imported into the interface for logged entries imported from a data source. However, the match function (without consolidation of lines) can be invoked again for re-matches—which are corrections of the matches. The AI model can evaluate the single logged entry line (which can include multiple logged entry line items consolidated into one) by comparing the single logged entry line to historical data representing previous logged entry line items that have already been matched to entry request record line items. The AI model can identify one or more entry request record line items that are likely to correspond to the single logged entry line item based on the historical data. The one or more predicted entry request record line items can be sent back to the interface using the REST service and displayed in respective data fields of the interface. If the user modifies any of the predicted one or more entry request record line items displayed in the interface, those modifications are sent back to the AI model as feedback to improve future predictions.

Figure 4:
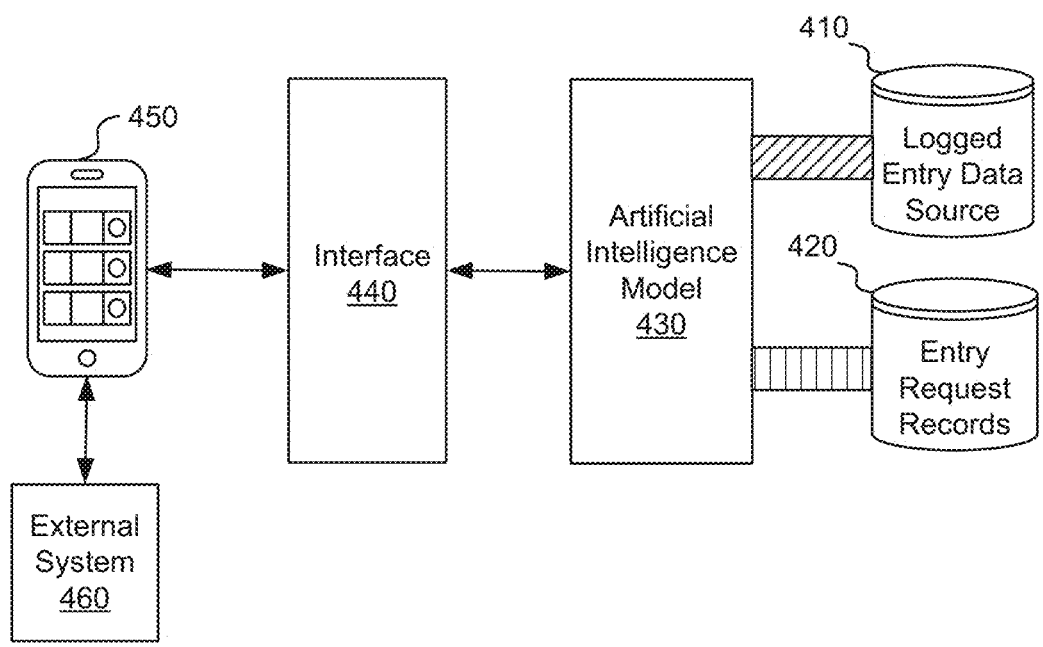
FIG. 4 is a block diagram illustrating an example network environment.

FIG. 4 illustrates network environment 400 for automatically predicting entry request record line items that match logged entry line items. Network environment 400 may include logged entry data source 410 and/or entry request record data source 420. In some implementations, logged entry data source 410 may include one or more data structures that store information from previously finalized logged entries. For example, the information from previously finalized logged entries may include supplier information, product information, logged entry value, currency information of the logged entry value, quantity of a product, service information, and/or the entry request record line items that were previously matched to each logged entry line item. Entry request record data source 420 may include one or more data structures that store information from entry request records that were previously matched to logged entry line items. For example, the entry request record data may include the product or service that was ordered, entry request record line shipments, entry request record receipts, the employee who ordered the product or service, the cost center associated with the product or service, employee details, and/or the one or more logged entry line items that were matched to each entry request record line item. It will be appreciated that the logged entry data source 410 and the entry request record data source 420 may also store information from logged entries that have not been finalized yet or entry request records that have not yet been matched with logged entry line items. Logged entry data source 410 and entry request record data source may store historical data representing the previous logged entries finalized and the previous entry request records created.

AI model 430 may include an AI network environment, in which an artificial intelligence and/or machine-learning model can be generated and trained. In some implementations, AI model 430 can be a model that is trained based on the data stored at logged entry data source 410 and entry request record data source 420. For example, training AI model 430 based on logged entry data source 410 and entry request record data source 420 may involve running one or more artificial intelligence algorithms and/or one or more machine-learning algorithms on the logged entry data and the entry request record data to identify patterns and/or dependencies between logged entry line items and entry request record line items. As a non-limiting example, training AI model 430 on the logged entry data and entry request record data may detect a dependency between the logged entry line items of a laptop, keyboard, and power cord with an entry request record line item of a laptop. Once this dependency is determined, then as future logged entry line items are evaluated by AI model 430, if the logged entry line items include a laptop, keyboard, and/or power cord, the AI model 430 can predict that the correct entry request record line item is a laptop. Then, the interface and/or the AI model 430 can search the available line items in a given entry request record (often identified on the logged entry) to identify that the line item corresponding to the laptop is the correct match for the evaluated logged entry line items.

In some implementations, external system 460 may represent one or more servers and/or networks operated by an originator. In response to receiving an entry request record from a company, external system 460 can transmit a logged entry to a computer device associated with the company, for example, user device 450. In some implementations, the logged entry may be transmitted to one or more servers operated by the company, and user device 450 may retrieve the logged entry from the one or more servers. A user operating user device 450 may enter logged entry information into interface 440. The interface 440 may display the entered logged entry information. Further, the logged entry may include the corresponding entry request record number, which identifies the particular entry request record that triggered the logged entry to be created. However, in some cases the entry request record number does not identify which entry request record line items correspond to each logged entry line item. The entry request record line item must be identified for each line item of a logged entry if the logged entry is to be accepted for finalization. In some implementations, the logged entry from external system 460 may be automatically loaded onto interface 440. Interface 440 may also display the one or more entry request record line items associated with the entry request record number. Each entry request record line item may be associated with an entry request record line number that uniquely identifies the entry request record line item. The user may select a button or link that causes the logged entry line items to be sent to AI model 430 using a REST service, however, for imported logged entries, the matching may be invoked during the import process and may not require the match button to be selected. The logged entry line items may be processed, along with the one or more entry request record line items. As a result of the processing, AI model 430 may identify or predict one or more entry request record line numbers of the entry request record that corresponds to each logged entry line item. The predicted entry request record line numbers can be transmitted back to the interface 440 using the REST service, and displayed on interface 440. Displaying the matched logged entry and entry request record data may include listing one or more logged entry line items in a first column and the corresponding predicted entry request record line number in a second adjacent column, however, the present disclosure is not limited thereto.

While user device 450 is shown as a mobile device in FIG. 4, it will be appreciated that user device 450 may be any portable electronic device (e.g., laptop, smartphone, tablet, etc.) or non-portable electronic device (e.g., desktop, electronic kiosk, etc.).

Figure 5:
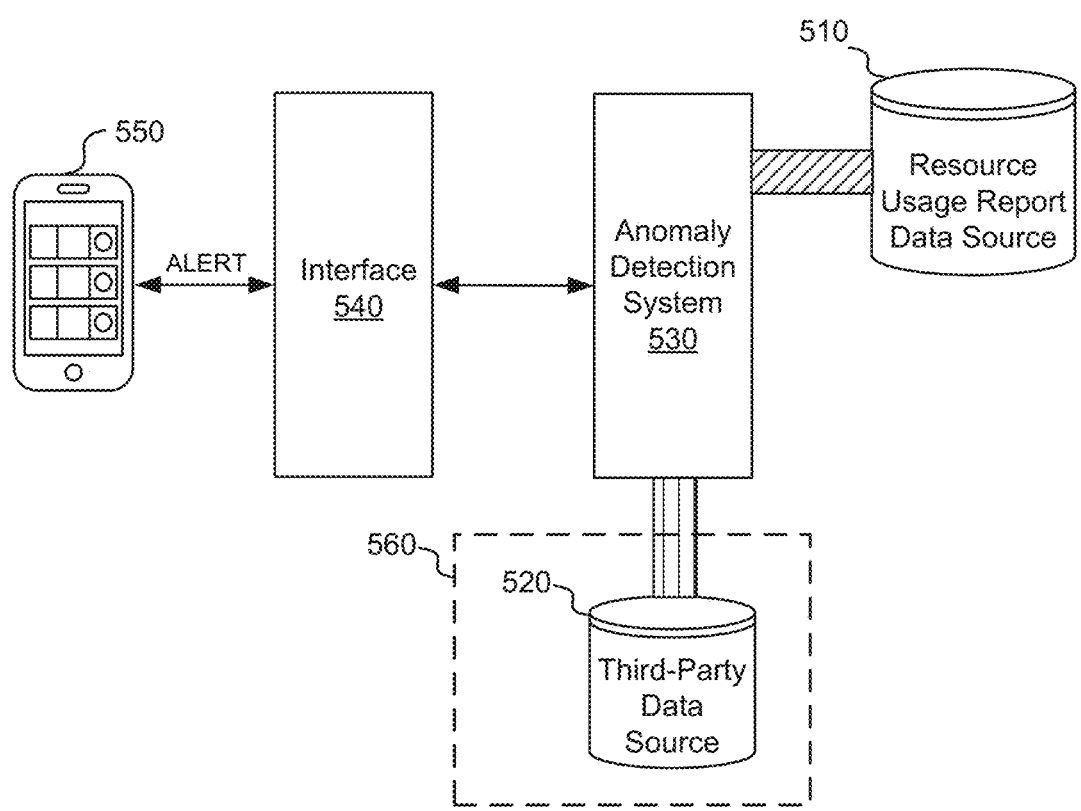
FIG. 5 is a block diagram illustrating a functional example of anomaly detection using third party data sets.

Referring now to FIG. 5, expense reports may be created to monitor expenses incurred by employees at a company. For example, if an employee travels for a company-related event, the expenses incurred by the employee may be included in an expense report. Further, the employee may be reimbursed by the company for the expenses that are included in the expense report. However, while expense reports need to be approved before reimbursing the employee, certain expenses listed in an expense report may be automatically approved. As a company increases in size, the volume of expense reports increases and fraudulent activity or erroneous expenses are difficult to detect.

Certain embodiments of the present disclosure relate to systems and methods that intelligently detect anomalies in expense reports and potentially alert managers of the detected anomalies. Further, in some implementations, the systems and methods may generate recommendations to managers or expense auditors regarding whether or not to approve expenses on an expense report. For example, anomaly detection techniques may be used to identify whether or not certain expenses fall within certain acceptable ranges. If an expense falls outside an acceptable range, then a recommendation to reject the expense or an alert of potential fraudulent activity may be sent to the manager or expense auditor. In some implementations, the manager or expense auditor may be notified if anomalies are detected within expense reports. If an anomaly is detected, then the expense report may be flagged and sent to a manager or expense auditor for further review. Similarly, the embodiments described herein may reduce the time it takes to audit expenses, thereby enabling managers or expense auditors to focus on potentially fraudulent transactions or patterns of transactions. In some implementations, an anomaly detection process described herein may automatically approve expense reports that are determined to be at a low risk of fraudulent activity, and conversely, highlight expenses and/or expense reports that have a high risk of being fraudulent.

In some implementations, the anomaly detection can be performed by a model that executes one or more anomaly detection algorithms to identify data point outliers within expense reports. For example, an anomaly detection algorithm may evaluate a distribution of expense identifiers, and determine whether a particular expense identifier is within a certain distribution. In some implementations, an expense identifier corresponds to one or more data points of information that represent a particular expense. For example, an expense identifier may represent or describe a particular expense, when the expense occurred, the employee who incurred the expense, and other suitable information about an expense incurred by an employee.

In some implementations, the anomaly detection is performed on expense data sets (e.g., expense reports stored internally at a company) and third-party data sets that are generated and maintained by third-party or external systems. For example, a public database, such as the Patent Application Information Retrieval database operated by the USPTO is a public database that is external to companies. It will be appreciated that a third-party data set may also be a privately accessible data set generated by a third-party system. A third-party data set may be evaluated to identify anomalies within expense reports. As a non-limiting example, a third-party data set may include data representing expenses incurred at a hotel. The third-party data set may be generated by a third-party system, such as by the company managing the hotel. An employee of a company not affiliated with the hotel may stay at the hotel for a work trip. While the employee stays at the hotel, the employee may incur expenses, which are ultimately included on an expense report and later submitted to the employee's employer for reimbursement. An anomaly detection system, as described herein, can evaluate the employee's expense report to determine whether the expense report includes any anomalies based on previous expense reports approved and/or denied by the employer. However, advantageously, the anomaly detection system can also evaluate the third-party data set to determine whether any expenses in the expense report are inconsistent with the third-party data set. For example, if the third-party data set includes data representing a cost of the hotel that is less than the cost of the hotel listed on the expense report, or if the cost of the hotel reservation included in the third-party data set was incurred on a different date as the expense for the hotel listed on the expense report, then the anomaly detection system can flag the expense report as including an anomaly.

In some implementations, an artificial intelligence and/or machine-learning aspect can also be included in the embodiments described herein. For instance, if the discrepancy between hotel reservations costs in the third-party data set as compared to the employee's expense report was previously flagged and approved as, for example, a mistake by the employee or hotel (or a different rate applied to the hotel reservation for various acceptable reasons), then the anomaly detection system may automatically determine not to flag the expense as it was previously an error or acceptable discrepancy. The expense report may also be automatically flagged, however, for error correction, instead of for fraud inspection.

It will be appreciated that the anomaly detection described herein is not limited to anomaly detection of expense reports. For example, the anomaly detection may also be performed on logged entries received from originators to identify fraudulent originators or originators who create erroneous logged entries, entry request records created by employees to identify purchase patterns, and other suitable uses. For anomaly detection of logged entries, the third-party data set may provide data associated with originators to facilitate the determination of anomalies from originators.

In some implementations, the anomaly detection system can validate expenses or logged entries against records included in a third-party data set. The records included in the third-party data set may be different from the expense reports or invoices, in that a record is created by a third party, not the company determining whether or not to approve the expense report or invoice. As a non-limiting example, records of a third-party data set may include records of inventory of a product. If the expense report or invoice contains data that is inconsistent with the records of the third-party data set, a potential error or fraud may be automatically flagged for further review by a manager.

Another non-limiting example of the anomaly detection may be for post-payment reconciliation. For example, the anomaly detection using a third-party data set can evaluate whether data is not aligned between an internal data source and the third-party data set (e.g., was the right code used for an invoice, was an invoice line item matched with the correct purchase order line item, and so on).

It will also be appreciated that the anomaly detection can evaluate internal data (e.g., expense reports) and external data (e.g., third-party data sets) to identify a seasonal component to the internal or external data. The seasonal component can be used to automatically learn whether or not the internal data or external data includes an anomaly. As a non-limiting example, certain types of expenses may be incurred by employees at certain times of the year, and those expenses would not be expected at other times of the year. The expectation of expenses during certain times of the year may be the seasonal component of the anomaly detection. For example, an anomaly detected can represent a discrepancy between an expense included in an expense report and a service provided by an originator. However, if the anomaly is detected during a seasonal time period in which the anomaly was previously reviewed by a manager or expense auditor and nonetheless approved, that anomaly may be automatically approved, or at least the anomaly detection system may generate a recommendation (for the manager or expense auditor) to approve the expense report despite the anomaly. However, if that same anomaly were detected during a different seasonal time period, then the anomaly may be flagged for further review by the manager or expense auditor, or the anomaly detection system may generate a recommendation to reject the expense report as erroneous or fraudulent.

FIG. 5 is a block diagram illustrating a functional example of anomaly detection using third party data sets. FIG. 5 illustrates network environment 500 may include resource usage report data source 510 and third-party data source 520. Resource usage report data source 510 may store all or part of the resource usage reports (e.g., expense reports) that are submitted by employees of a company. Resource usage report data source 510 may store, for example, approved, rejected, held, and/or unapproved resource usage reports. Further, resource usage report data source 510 may be a data source that is internal to the company. Third-party data source 520 may one or more servers that include data structures storing third-party data sets. The third-party data sets may include one or more records recorded by an external third-party system 560. The external third-party system 560 may be external to the company approving the resource usage reports.

Anomaly detection system 530 may execute one or more anomaly detection techniques to identify anomalies in the resource usage report data stored at resource usage report data source 510 and/or in the third-party data set stored at third-party data source 520. In some implementations, anomaly detection system 530 may evaluate the resource usage report data for anomalies in light on the records included in the third-party data set. In some implementations, anomaly detection system 530 may evaluate the third-party data set for anomalies in light of the resource usage report data.

Interface 540 may be an interface provided to a user who can approve or reject resource usage reports. In some implementations, interface 540 may be provided to an auditor auditing the resource usage report data. If anomaly detection system 530 detects an anomaly, then anomaly detection system 530 can transmit a notification signal to interface 540, which can generate an alert to the user (e.g., manager or auditor) who is operating user device 550 (similar to user device 450). In some implementations, an alert may include a recommendation to approve or not to approve a resource usage report, or a flagged resource usage that needs further review by a manager or auditor.

It will be appreciated that anomaly detection system 530 can be used to detect anomalies in any data set, and thus, the present disclosure is not limited to anomalies in resource usage reports. For example, anomaly detection system 530 can evaluate logged entries, entry request record, legal bills, and any other suitable document.

Figure 6:
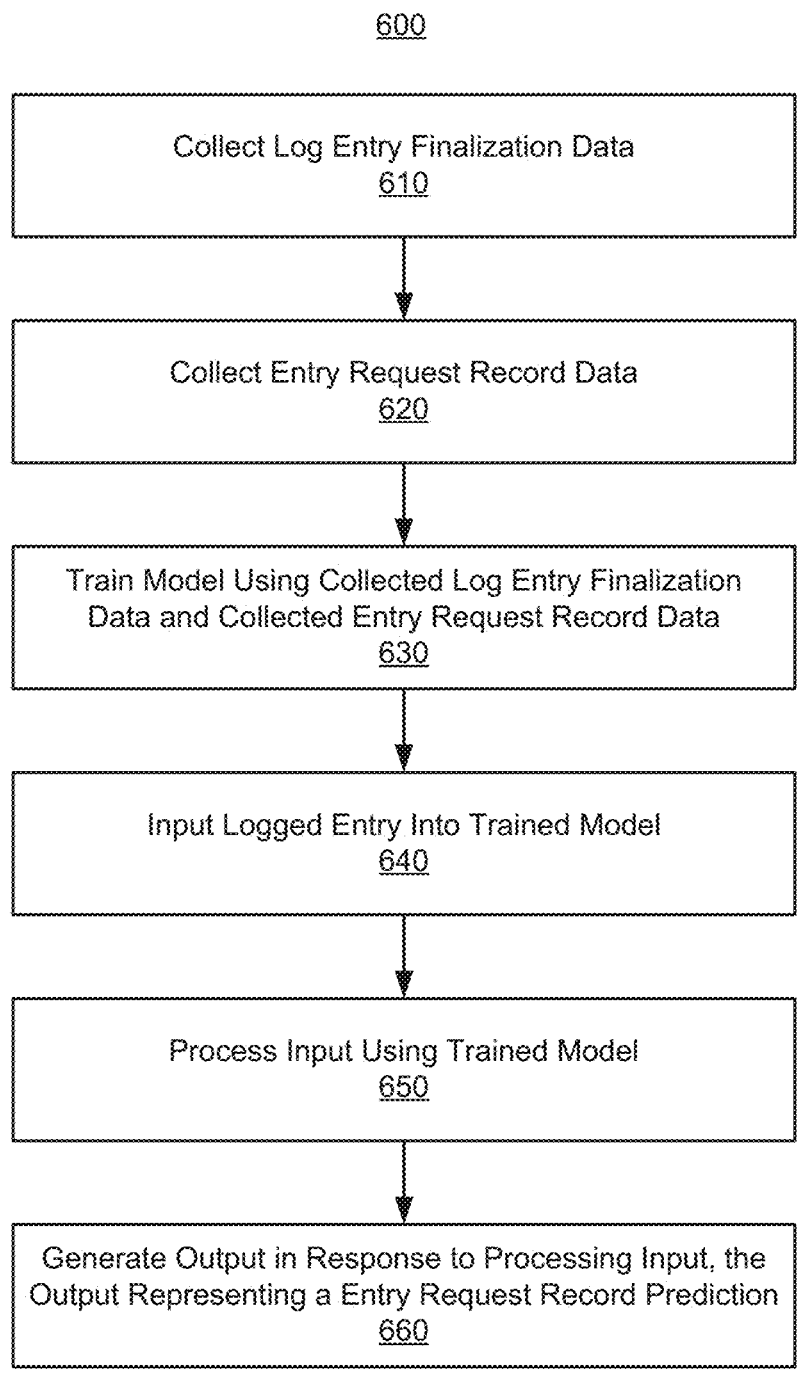
FIG. 6 is a flowchart illustrating an example of a process for predicting which logged entries match entry request record line items, according to some aspects.

FIG. 6 is a flowchart illustrating an example of a process for predicting matches between logged entry items (e.g., invoice line items) and entry request record line items (e.g., purchase order line items) using machine-learning models. Any step of process 600 may be performed at least in part by any component illustrated (or not shown) in FIGS. 4-5. For example, process 600 may be performed at least in part by AI model 430. Further, process 600 may be performed to predict which logged entry items matches one or more entry request record line items.

Process 600 begins at block 610, where log entry finalization data is collected, for example, by logged entry data source 410. Log entry finalization data may represent one or more logged entries that an originator (e.g., a supplier) has proposed for finalization (e.g., requested that an invoice generated by the supplier be paid by the company that purchased an item from the supplier). The one or more logged entries, if finalized, would trigger a downstream action (e.g., payment of the invoice) that reassigns resources (e.g., funds) from a resource pool to the originator. Each logged entry of the one or more logged entries may correspond to an entry request record (e.g., a purchase order) that initiated the logged entry. For example, the creation of an entry request record may occur when a user decides to purchase an item. The entry request record may characterize aspects of the item being purchased (e.g., quantity, model number, price, etc.). Further, the entry request record may be transmitted to the originator before the originator provides the item to the user.

Each logged entry of the one or more logged entries may include one or more logged entry items (e.g., characteristics or parts of the item being purchased). For a given logged entry, the one or more logged entry items sum to a logged entry resource request total of the logged entry. Further, each logged entry item of the one or more logged entry items correspond to a resource usage (e.g., an expense) that is proposed, by the originator, to be within the entry request record. To illustrate and only as a non-limiting example, once the originator receives the entry request record for one or more items, the originator may provide the one or more items to the user, along with a logged entry. The logged entry may indicate that the item has been or will be provided. Further, the logged entry may characterize the item in a format (e.g., quantity, price, parts, etc.). The logged entry may be finalized by the user (e.g., processed and paid) after the logged entry is matched against the entry request record that corresponds to the item included in the logged entry. However, matching the entry request record with the logged entry may be difficult in some cases. For example, the entry request record may describe the item in a different format or manner than the characterization of the item in the logged entry. Certain embodiments of the present disclosure provide the user with an interface that can display predictions of which logged entry items (e.g., invoice line items) match with entry request record line items (e.g., purchase order line items).

At block 620, entry request record data may be collected, for example, by entry request records data source 420. The entry request record data may represent one or more entry request records transmitted to the originator at previous times. Each entry request record may include one or more entry request record line items (e.g., purchase order line items) that sum to an entry request record resource request total. Further, each entry request record line item of the one or more entry request record line items may correspond to a resource usage (e.g., expense) proposed to be the within the entry request record. The entry request record data that is collected may represent some or all of the entry request records that have been previously matched with logged entries or logged entry items. Thus, the previously finalized logged entries and the previously matched entry request records may serve as a training data set for a machine-learning model, as described below.

At block 630, a machine-learning model may be trained using a training data set including the collected logged entry finalization data and the collected entry request record data. For example, one or more machine-learning or artificial intelligence techniques may be executed on the training data set. As a non-limiting example, the logged entries included in the logged entry finalization data may have been previously finalized. Finalizing a logged entry occurs when, for example, one or more logged entry items included in a logged entry is matched with one or more entry request record line items of an entry request record. Thus, the previously matched data may serve as labeled data for supervised learning algorithms, such as Naïve Bayes, tree models (e.g., random forest), logistic regression models, and deep learning algorithms. The supervised learning algorithms may be executed to train the machine-learning model to generate outputs that can be used to predict which entry request record line items are likely to match a new logged entry item. It will be appreciated that ensemble-learning methods, such as bagging and boosting, may be used to train or execute the machine-learning model. It will also be appreciated that unsupervised or semi-supervised learning algorithms may be used to identify which logged entry items match which entry request record line items, if there is no labeled data in the training data set.

At block 640, a user may input a particular logged entry into an interface for predicting matches between logged entries and entry request records. The particular logged entry may not yet be finalized, and thus, the user may input details of the particular logged entry (e.g., a logged entry identifier, a logged entry item identifier, an identifier of an item listed as a logged entry item identifier, and so on) into the interface. The interface may use a REST service to transmit the user-inputted data to AI model system 430, for example. At block 650, the AI model may process the user-inputted data (e.g., the details of a logged entry or one or more logged entry items that have not yet been finalized, and thus, for which a matched entry request record line item is needed before the logged entry can be finalized).

At block 660, the AI model may generate one or more outputs in response to processing the user-inputted data at block 650. The one or more outputs may be evaluated to predict one or more entry request record line items that are likely (e.g., above a defined confidence threshold) to match the particular logged entry (or the particular logged entry item(s)). The one or more outputs of the model (e.g., the predicted one or more entry request record line items) may be transmitted by the AI model system 430 to the interface using the REST service. The interface may then display the predicted entry request record line items that are likely to match the particular logged entry (or logged entry items) inputted by the user. The user may then select the predicted entry request record (or entry request record line items) if the prediction was accurate. If not, then the user may enter in the details of the correct entry request record (or entry request record line items) that match the particular logged entry. The correct entry request record may then be transmitted back to the AI model using the REST service, so that the AI model can be updated to improve future predictions.

Figure 7:
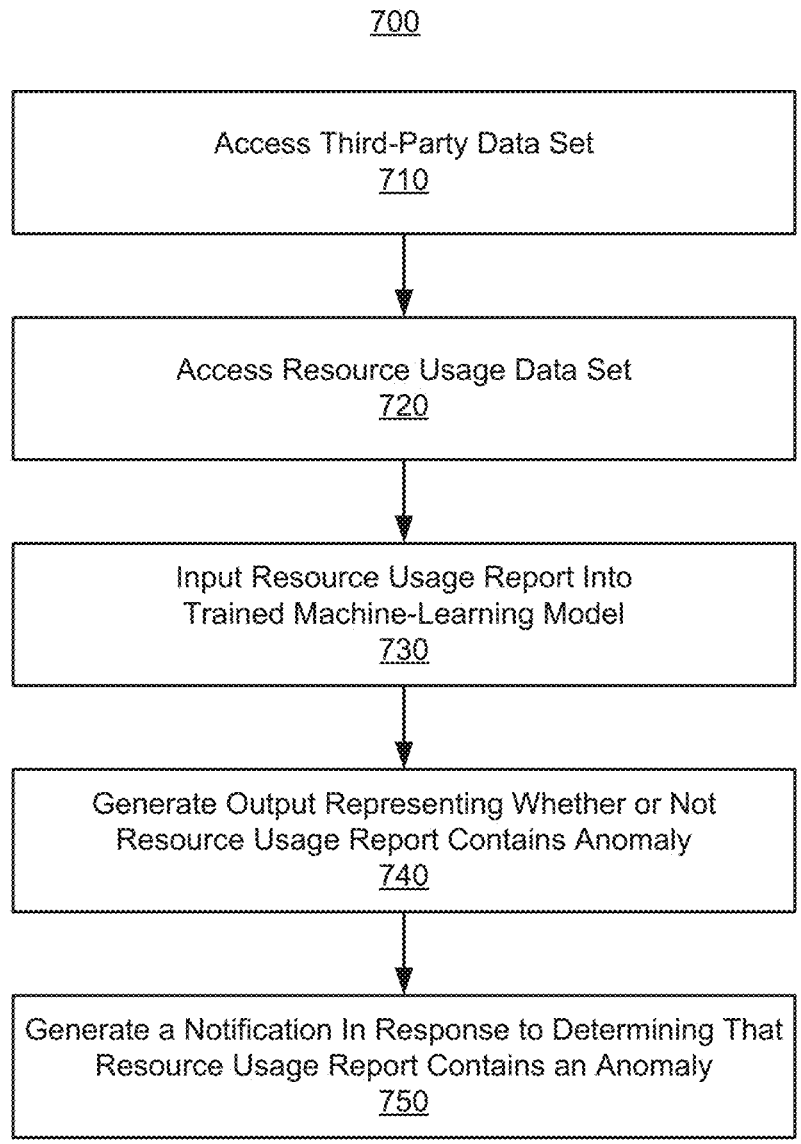
FIG. 7 is a flowchart illustrating an example of a process for intelligently detecting anomalies within resource usage reports, according to some aspects.

FIG. 7 is a flowchart illustrating an example of a process for intelligently predicting anomalies in resource usage reports (e.g., expense reports or invoices). Any or all steps of process 700 may be performed by any components illustrated in FIGS. 4-5. For example, process 700 may be performed, at least in part, by anomaly detection system 530. Further, process 700 may be performed to identify resource usage reports that may contain anomalies.

Process 700 begins at block 710, where a third-party data set is accessed. For example, a third-party data set may include a public database that provides makes certain records publicly available). The third-party data set may include a set of records recorded by a third-party system. The third-party system may or may not be associated with the third-party data source. To illustrate and only as a non-limiting example, the set of records may include filings submitted to the U.S. Patent & Trademark Office by patent applications, which are published on a public database).

At block 720, a resource usage data set can be accessed, for example, by the anomaly detection system 530. The resource usage data set may represent a plurality of resource usage reports. Examples of resource usage reports may include expense reports, invoices, purchase orders, and so on. Each resource usage report may be generated in association with a user requesting reimbursement of an expense.

At block 730, inputting a particular resource usage report into a trained machine-learning model. The trained model having been trained using the third-party data set and the resource usage data set. For example, one or more anomaly detection algorithms may be executed on the third-party data set and the resource usage data set to determine the distributions for previously approved expenses. Further, the one or more anomaly detection algorithms may calculate a Gaussian distribution of values of previous approved expenses of a certain type. The one or more anomaly detection algorithms may also detect correlations between the previous approved expenses and the third-party data set. The trained model may then be configured to identify anomalies or at least alert users to potentially anomalous behavior.

At block 740, the trained model may generate one or more outputs in response to inputting the resource usage report into the trained model. The one or more outputs may be indicative of whether or not executing the trained model caused one or more anomalies to be detected in the particular resource usage report. If an anomaly is detected, a notification may be generated at block 750. For example, the notification may be sent to a specific or predefined user (e.g., a supervisor or manager). If no anomaly is detected, then process 700 may stop. Alternatively, if no anomalies are detected, then process 700 may include notifying users that no anomalies were detected.

While an example of a logged entry has been described as an invoice and an example of an entry request record has been described as a purchase order, it will be appreciated that a logged entry and an entry request record may be any documents in which information is itemized (e.g., listed as line items), which may can be matched with each other or otherwise share a dependency. Thus, the present disclosure is not limited to the examples of logged entries and entry request records, as described herein.

Figure 8:
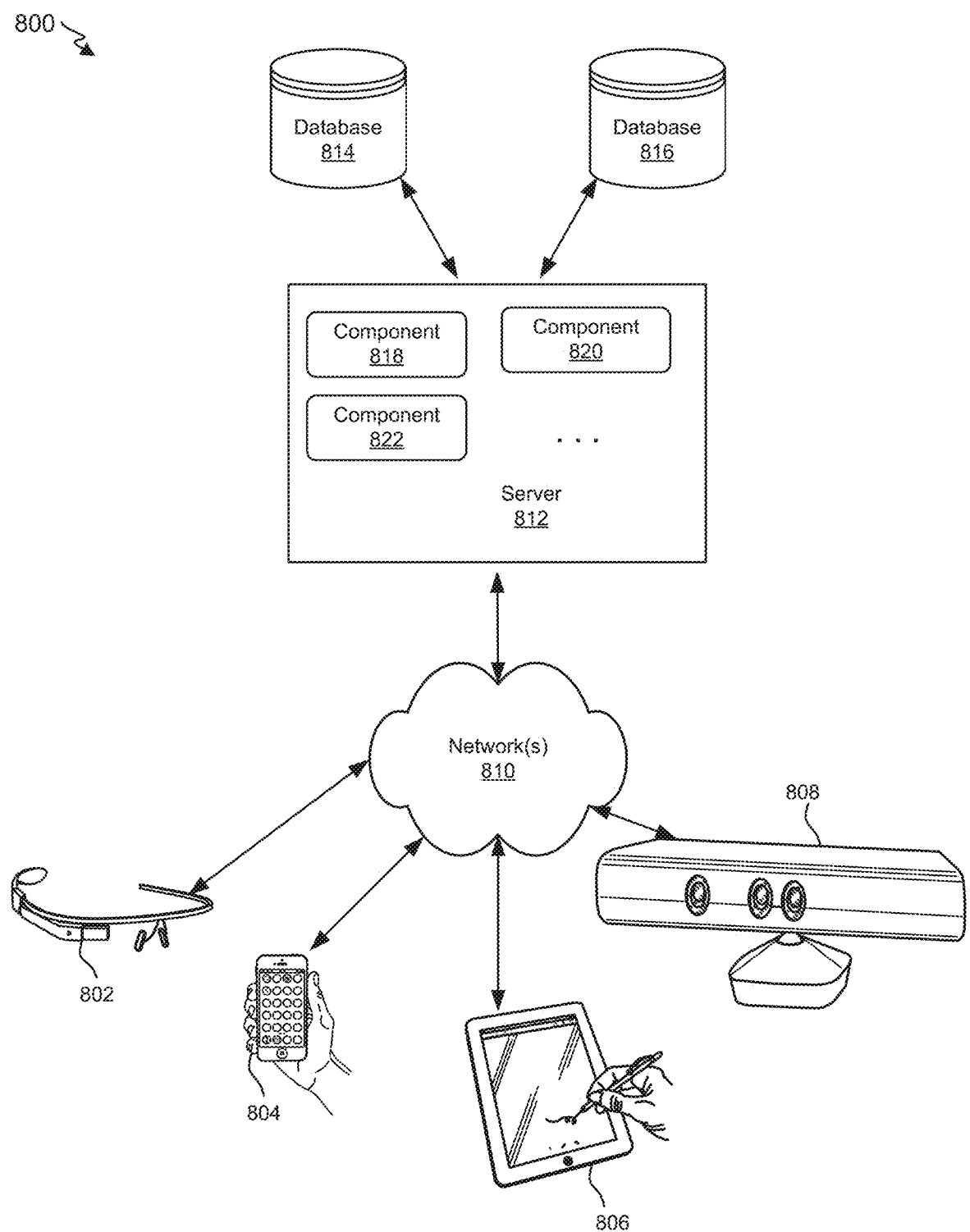
FIG. 8 is a simplified diagram illustrating a distributed system for implementing one of the embodiments.

FIG. 8 depicts a simplified diagram of a distributed system 800 for implementing one of the embodiments. In the illustrated embodiment, distributed system 800 includes one or more client computing devices 802, 804, 806, and 808, which are configured to execute and operate a client application such as a web browser, proprietary client (e.g., Oracle Forms), or the like over one or more network(s) 810. Server 812 may be communicatively coupled with remote client computing devices 802, 804, 806, and 808 via network 810.

In various embodiments, server 812 may be adapted to run one or more services or software applications provided by one or more of the components of the system. In some embodiments, these services may be offered as web-based or cloud services or under a Software as a Service (SaaS) model to the users of client computing devices 802, 804, 806, and/or 808. Users operating client computing devices 802, 804, 806, and/or 808 may in turn utilize one or more client applications to interact with server 812 to utilize the services provided by these components.

In the configuration depicted in the figure, the software components 818, 820 and 822 of system 800 are shown as being implemented on server 812. In other embodiments, one or more of the components of system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in the figure is thus one example of a distributed system for implementing an embodiment system and is not intended to be limiting.

Client computing devices 802, 804, 806, and/or 808 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 802, 804, 806, and 808 may be any other electronic device, such as a thin-client computer, an Internet-enabled gaming system (e.g., a Microsoft Xbox gaming console with or without a Kinect® gesture input device), and/or a personal messaging device, capable of communicating over network(s) 810.

Although exemplary distributed system 800 is shown with four client computing devices, any number of client computing devices may be supported. Other devices, such as devices with sensors, etc., may interact with server 812.

Network(s) 810 in distributed system 800 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 810 can be a local area network (LAN), such as one based on Ethernet, Token-Ring and/or the like. Network(s) 810 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 812 may be adapted to run one or more services or software applications described in the foregoing disclosure. For example, server 812 may correspond to a server for performing processing described above according to an embodiment of the present disclosure.

Server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 812 may include one or more applications to analyze and consolidate data feeds and/or event updates received from users of client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 812 may also include one or more applications to display the data feeds and/or real-time events via one or more display devices of client computing devices 802, 804, 806, and 808.

Distributed system 800 may also include one or more databases 814 and 816. Databases 814 and 816 may reside in a variety of locations. By way of example, one or more of databases 814 and 816 may reside on a non-transitory storage medium local to (and/or resident in) server 812. Alternatively, databases 814 and 816 may be remote from server 812 and in communication with server 812 via a network-based or dedicated connection. In one set of embodiments, databases 814 and 816 may reside in a storage-area network (SAN). Similarly, any necessary files for performing the functions attributed to server 812 may be stored locally on server 812 and/or remotely, as appropriate. In one set of embodiments, databases 814 and 816 may include relational databases, such as databases provided by Oracle, that are adapted to store, update, and retrieve data in response to SQL-formatted commands.

Figure 9:
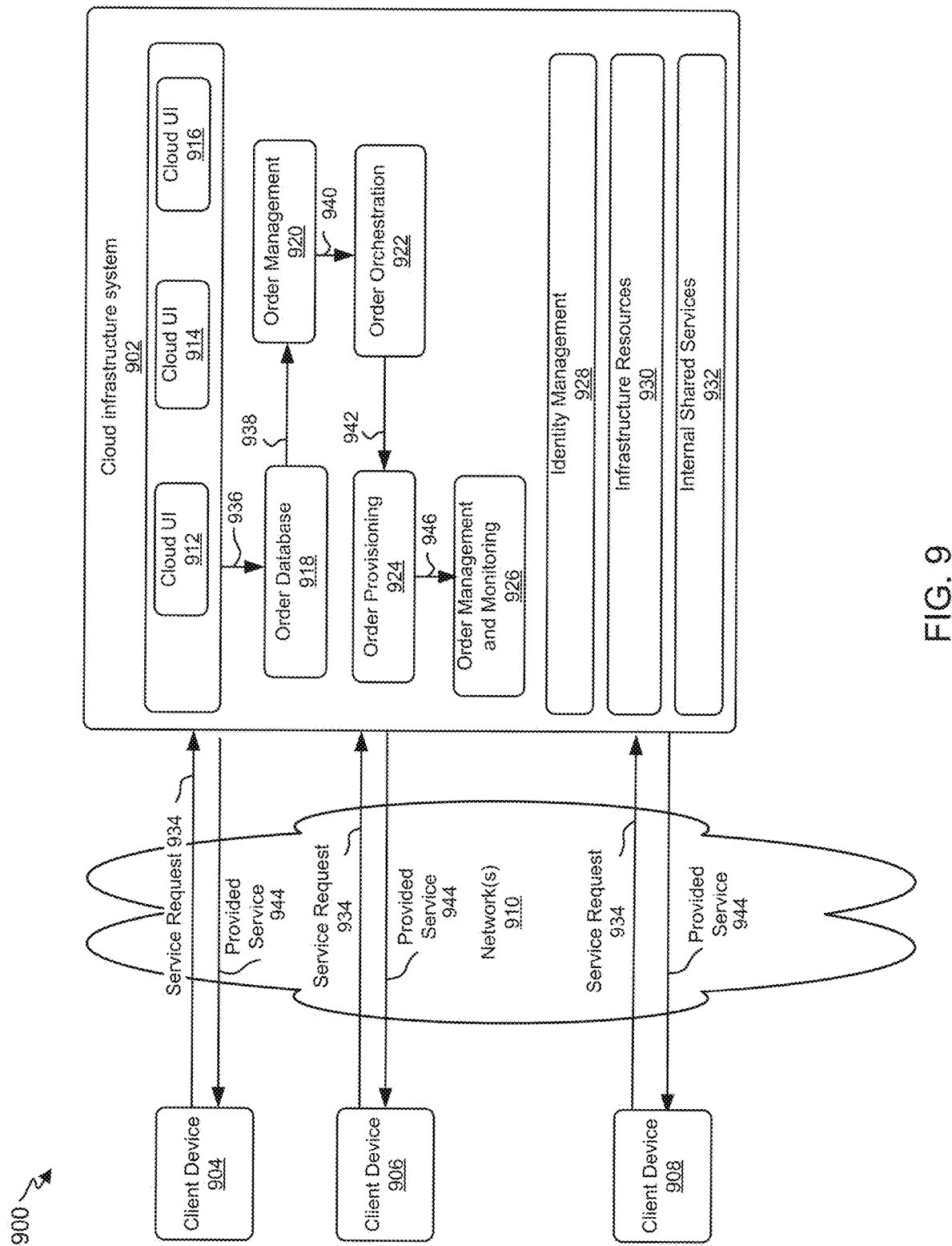
FIG. 9 is a simplified block diagram illustrating one or more components of a system environment.

FIG. 9 is a simplified block diagram of one or more components of a system environment 900 by which services provided by one or more components of an embodiment system may be offered as cloud services, in accordance with an embodiment of the present disclosure. In the illustrated embodiment, system environment 900 includes one or more client computing devices 904, 906, and 908 that may be used by users to interact with a cloud infrastructure system 902 that provides cloud services. The client computing devices may be configured to operate a client application such as a web browser, a proprietary client application (e.g., Oracle Forms), or some other application, which may be used by a user of the client computing device to interact with cloud infrastructure system 902 to use services provided by cloud infrastructure system 902.

It should be appreciated that cloud infrastructure system 902 depicted in the figure may have other components than those depicted. Further, the embodiment shown in the figure is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808.

Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 810.

Cloud infrastructure system 902 may comprise one or more computers and/or servers that may include those described above for server 812.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud or locally hosted applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform.

In some embodiments, resources in cloud infrastructure system 902 may be shared by multiple users and dynamically re-allocated per demand. Additionally, resources may be allocated to users in different time zones. For example, cloud infrastructure system 930 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 and by the services provided by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in the figure, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In exemplary operation 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI), cloud UI 912, cloud UI 914 and/or cloud UI 916 and place a subscription order via these UIs. The order information received by cloud infrastructure system 702 in response to the customer placing an order may include information identifying the customer and one or more services offered by the cloud infrastructure system 902 that the customer intends to subscribe to.

After an order has been placed by the customer, the order information is received via the cloud UIs, 912, 914 and/or 916.

At operation 936, the order is stored in order database 918. Order database 918 can be one of several databases operated by cloud infrastructure system 918 and operated in conjunction with other system elements.

At operation 938, the order information is forwarded to an order management module 920. In some instances, order management module 920 may be configured to perform billing and accounting functions related to the order, such as verifying the order, and upon verification, booking the order.

At operation 940, information regarding the order is communicated to an order orchestration module 922. Order orchestration module 922 may utilize the order information to orchestrate the provisioning of services and resources for the order placed by the customer. In some instances, order orchestration module 922 may orchestrate the provisioning of resources to support the subscribed services using the services of order provisioning module 924.

In certain embodiments, order orchestration module 922 enables the management of processes associated with each order and applies logic to determine whether an order should proceed to provisioning. At operation 942, upon receiving an order for a new subscription, order orchestration module 922 sends a request to order provisioning module 924 to allocate resources and configure those resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. Order orchestration module 922 may thus be isolated from implementation details, such as whether or not services and resources are actually provisioned on the fly or pre-provisioned and only allocated/assigned upon request.

At operation 944, once the services and resources are provisioned, a notification of the provided service may be sent to customers on client devices 904, 906 and/or 908 by order provisioning module 924 of cloud infrastructure system 902.

At operation 946, the customer's subscription order may be managed and tracked by an order management and monitoring module 926. In some instances, order management and monitoring module 926 may be configured to collect usage statistics for the services in the subscription order, such as the amount of storage used, the amount data transferred, the number of users, and the amount of system up time and system down time.

In certain embodiments, cloud infrastructure system 900 may include an identity management module 928. Identity management module 928 may be configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.). Identity management module 928 may also include the management of descriptive information about each customer and about how and by whom that descriptive information can be accessed and modified.

Figure 10:
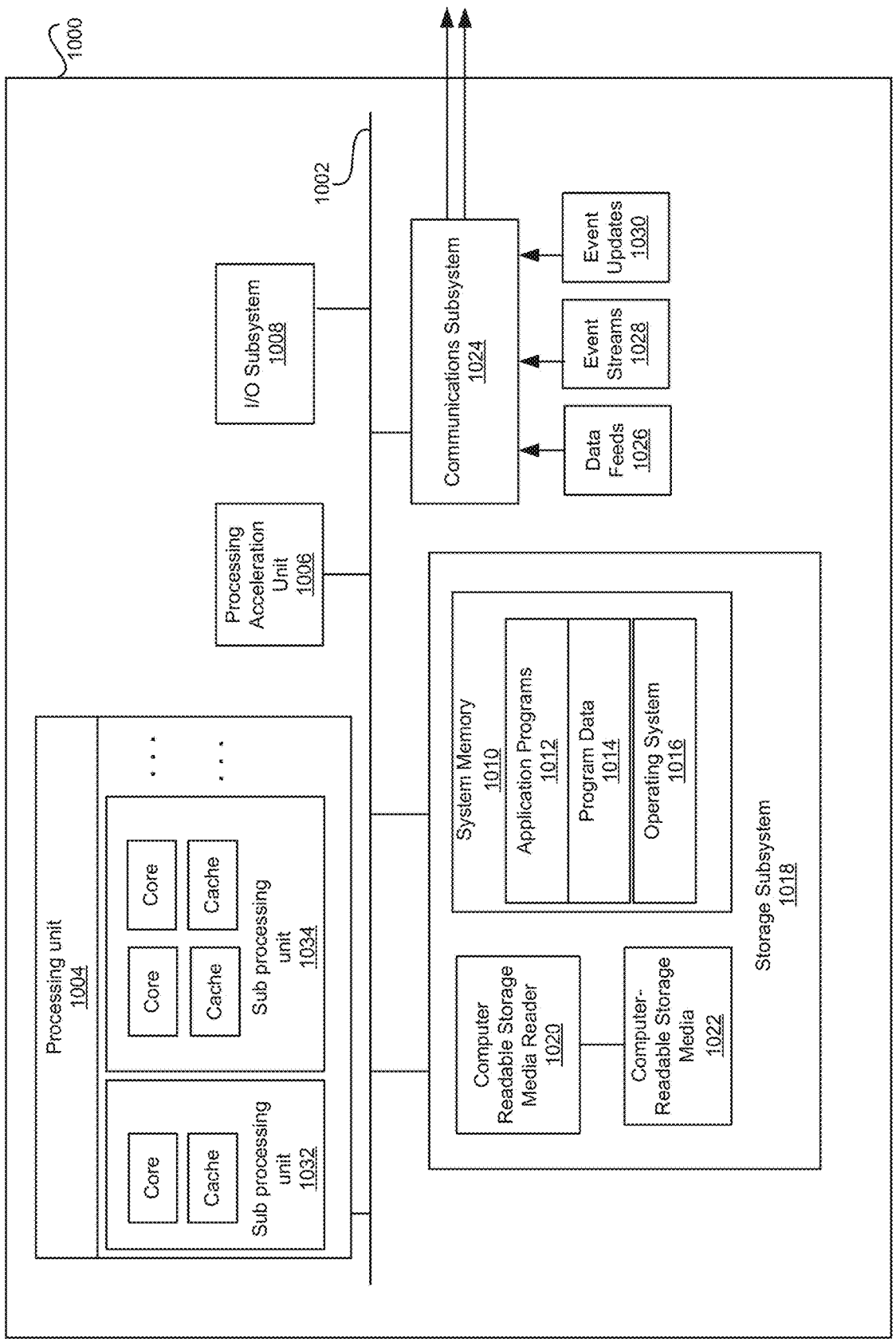
FIG. 10 illustrates an exemplary computer system, in which various embodiments of the present invention may be implemented.

FIG. 10 illustrates an exemplary computer system 1000, in which various embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 924 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    accessing, from one or more first data sources, first data representing a set of resource usage reports generated by a first entity, the first data comprising, for each resource usage report of the set of resource usage reports, data identifying a resource usage, data identifying a resource usage amount of the resource usage, data identifying a date of the resource usage, and data identifying a user reporting the resource usage;
    accessing, from one or more second data sources, second data representing a set of transaction records generated by one or more second entities other than the first entity, the second data comprising, for each transaction record of the set of transaction records, data identifying a transaction, data identifying a transaction amount of the transaction, data identifying a date of the transaction, and data identifying an entity recording the transaction;
    inputting the first data and the second data into a trained machine-learning model;
    determining, using the trained machine-learning model, that one or more first anomalies exist between the first data and the second data, each anomaly of the one or more first anomalies corresponding to a difference between at least one resource usage report of the set of resource usage reports input into the trained machine-learning model and one or more transaction records of the set of transaction records input into the trained machine-learning model; and
    in response to determining that one or more first anomalies exist between the first data and the second data, outputting a first notification that indicates that the set of resource usage reports includes at least one anomaly.

2. The computer-implemented method of claim 1, wherein a subset of resource usage reports of the set of resource usage reports includes resource usage reports approved by a user associated with the first entity, and wherein a subset of transaction records of the set of transaction records includes transactions records verified by a user associated with at least one entity of the one or more second entities other than the first entity.

3. The computer-implemented method of claim 1, wherein the first data represents a set of expense reports.

4. The computer-implemented method of claim 3, wherein the first data further represents a set of invoices, or a set of purchase orders, the method further comprising:
    inputting the first data representing the set of invoices or the set of purchase orders into the trained machine-learning model;
    determining, using the trained machine-learning model, that one or more additional anomalies exist between the first data and the second data, each additional anomaly of the one or more additional anomalies corresponding to a difference between at least one invoice of the set of invoices or at least one purchase order of the set of purchase orders and one or more other transaction records of the set of transaction records; and
    in response to determining one or more additional anomalies exist between the first data and the second data, outputting a second notification that indicates that the set of resource usage reports includes at least one additional anomaly.

5. The computer-implemented method of claim 1, the trained machine-learning model having been trained with a subset of resource usage reports of the set of resource usage reports and a subset of transaction records of the set of transaction records.

6. The computer-implemented method of claim 1, the method further comprising:
    accessing, from the one or more first data sources, third data, the third data representing a set of additional resource usage reports generated by the first entity;
    determining, using the trained machine-learning model, that one or more second anomalies exist between the third data and the first data, each second anomaly of the one or more second anomalies corresponding to a difference between an additional resource usage report of the set of additional resource usage reports and a resource usage report of the set of resource usage reports; and
    in response to determining one or more second anomalies exist between the third data and the first data, outputting a second notification that indicates that the set of resource usage reports includes at least one other anomaly.

7. A system, comprising:
    one or more processors; and
    a computer-readable storage medium containing instructions which, when executed on the one or more processors, cause the one or more processors to perform operations including:

accessing, from one or more first data sources, first data representing a set of resource usage reports generated by a first entity, the first data comprising, for each resource usage report of the set of resource usage reports, data identifying a resource usage, data identifying a resource usage amount of the resource usage, data identifying a date of the resource usage, and data identifying a user reporting the resource usage;

accessing, from one or more second data sources, second data representing a set of transaction records generated by one or more second entities other than the first entity, the second data comprising, for each transaction record of the set of transaction records, data identifying a transaction, data identifying a transaction amount of the transaction, data identifying a date of the transaction, and data identifying an entity recording the transaction;

inputting the first data and the second data into a trained machine-learning model;

determining, using the trained machine-learning model, that one or more first anomalies exist between the first data and the second data, each anomaly of the one or more first anomalies corresponding to a difference between at least one resource usage report of the set of resource usage reports input into the trained machine-learning model and one or more transaction records of the set of transaction records input into the trained machine-learning model; and in response to determining that one or more first anomalies exist between the first data and the second data, outputting a first notification that indicates that the set of resource usage reports includes at least one anomaly.

8. The system of claim 7, wherein a subset of resource usage reports of the set of resource usage reports includes resource usage reports approved by a user associated with the first entity, and wherein a subset of transaction records of the set of transaction records includes transactions records verified by a user associated with at least one entity of the one or more second entities other than the first entity.

9. The system of claim 7, wherein the first data represents a set of expense reports.

10. The system of claim 9, wherein the first data further represents a set of invoices, or a set of purchase orders, the operations further comprising:

inputting the first data representing the set of invoices or the set of purchase orders into the trained machine-learning model;

determining, using the trained machine-learning model, that one or more additional anomalies exist between the first data and the second data, each additional anomaly of the one or more additional anomalies corresponding to a difference between at least one invoice of the set of invoices or at least one purchase order of the set of purchase orders and one or more other transaction records of the set of transaction records; and in response to determining one or more additional anomalies exist between the first data and the second data, outputting a second notification that indicates that the set of resource usage reports includes at least one additional anomaly.

11. The system of claim 9, the trained machine-learning model having been trained with a subset of resource usage reports of the set of resource usage reports and a subset of transaction records of the set of transaction records.

12. The system of claim 9, the operations further comprising:

accessing, from the one or more first data sources, third data, the third data representing a set of additional resource usage reports generated by the first entity;

determining, using the trained machine-learning model, that one or more second anomalies exist between the third data and the first data, each second anomaly of the one or more second anomalies corresponding to a difference between an additional resource usage report of the set of additional resource usage reports and a resource usage report of the set of resource usage reports; and in response to determining one or more second anomalies exist between the third data and the first data, outputting a second notification that indicates that the set of resource usage reports includes at least one other anomaly.

13. A non-transitory computer-readable medium storing computer-readable instructions that, when executed by one or more processors, cause the one or more processors to perform operations including:

accessing, from one or more first data sources, first data representing a set of resource usage reports generated by a first entity, the first data comprising, for each resource usage report of the set of resource usage reports, data identifying a resource usage, data identifying a resource usage amount of the resource usage, data identifying a date of the resource usage, and data identifying a user reporting the resource usage;

accessing, from one or more second data sources, second data representing a set of transaction records generated by one or more second entities other than the first entity, the second data comprising, for each transaction record of the set of transaction records, data identifying a transaction, data identifying a transaction amount of the transaction, data identifying a date of the transaction, and data identifying an entity recording the transaction;

inputting the first data and the second data into a trained machine-learning model;

determining, using the trained machine-learning model, that one or more first anomalies exist between the first data and the second data, each anomaly of the one or more first anomalies corresponding to a difference between at least one resource usage report of the set of resource usage reports input into the trained machine-learning model and one or more transaction records of the set of transaction records input into the trained machine-learning model; and in response to determining that one or more first anomalies exist between the first data and the second data, outputting a first notification that indicates that the set of resource usage reports includes at least one anomaly.

14. The non-transitory computer-readable medium of claim 13, wherein a subset of resource usage reports of the set of resource usage reports includes resource usage reports approved by a user associated with the first entity, and wherein a subset of transaction records of the set of transaction records includes transactions records verified by a user associated with at least one entity of the one or more second entities other than the first entity.

15. The non-transitory computer-readable medium of claim 13, wherein the first data represents a set of expense reports.

16. The non-transitory computer-readable medium of claim 15, wherein the first data further represents a set of invoices, or a set of purchase orders, the operations further comprising:

inputting the first data representing the set of invoices or the set of purchase orders into the trained machine-learning model;

determining, using the trained machine-learning model, that one or more additional anomalies exist between the first data and the second data, each additional anomaly of the one or more additional anomalies corresponding to a difference between at least one invoice of the set of invoices or at least one purchase order of the set of purchase orders and one or more other transaction records of the set of transaction records; and in response to determining one or more additional anomalies exist between the first data and the second data, outputting a second notification that indicates that the set of resource usage reports includes at least one additional anomaly.

17. The non-transitory computer-readable medium of claim 13, the trained machine-learning model having been trained with a subset of resource usage reports of the set of resource usage reports and a subset of transaction records of the set of transaction records.

18. The non-transitory computer-readable medium of claim 13, the operations further comprising:

accessing, from the one or more first data sources, third data, the third data representing a set of additional resource usage reports generated by the first entity;

determining, using the trained machine-learning model, that one or more second anomalies exist between the third data and the first data, each second anomaly of the one or more second anomalies corresponding to a difference between an additional resource usage report of the set of additional resource usage reports and a resource usage report of the set of resource usage reports; and in response to determining one or more second anomalies exist between the third data and the first data, outputting a second notification that indicates that the set of resource usage reports includes at least one other anomaly.

* * * * *

UNITED STATES PATENT AND TRADEMARK OFFICE
CERTIFICATE OF CORRECTION

PATENT NO. : 11,915,195 B2  
APPLICATION NO. : 17/809342  
DATED : February 27, 2024  
INVENTOR(S) : Tatituri et al.

Page 1 of 1

It is certified that error appears in the above-identified patent and that said Letters Patent is hereby corrected as shown below:

In the Specification

In Column 9, Line 46, delete "DataIlodes" and insert -- DataNodes --, therefor.

In Column 28, Line 34, delete "Uls." and insert -- UIs. --, therefor.

Signed and Sealed this  
Twenty-third Day of July, 2024

Katherine Kelly Vidal  
*Director of the United States Patent and Trademark Office*